(12) United States Patent
Brumfield et al.

(10) Patent No.: US 8,768,816 B2
(45) Date of Patent: Jul. 1, 2014

(54) SYSTEM AND METHOD FOR AUTOMATIC SCALPING A TRADEABLE OBJECT IN AN ELECTRONIC TRADING ENVIRONMENT

(75) Inventors: Harris Brumfield, Chicago, IL (US); Joan Ebersole, Glen Ellyn, IL (US); Assaf Pazner, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1068 days.

(21) Appl. No.: 11/417,484

(22) Filed: May 3, 2006

(65) Prior Publication Data

US 2006/0259404 A1    Nov. 16, 2006

Related U.S. Application Data

(63) Continuation of application No. 10/403,879, filed on Mar. 31, 2003, now Pat. No. 7,447,655, which is a continuation-in-part of application No. 10/125,894, filed on Apr. 19, 2002, now Pat. No. 7,389,268, which is a continuation-in-part of application No. 09/971,087, filed on Oct. 5, 2001, now Pat. No. 7,127,424, application No. 10/125,894, which is a continuation-in-part of application No. 09/590,692, filed on Jun. 9, 2000, now Pat. No. 6,772,132, and a continuation-in-part of application No. 09/589,751, filed on Jun. 9, 2000, now Pat. No. 6,938,011.

(60) Provisional application No. 60/238,001, filed on Oct. 6, 2000, provisional application No. 60/186,322, filed on Mar. 2, 2000, provisional application No. 60/325,553, filed on Oct. 1, 2001.

(51) Int. Cl.
*G06Q 40/00*    (2012.01)

(52) U.S. Cl.
USPC .............................................. 705/37; 705/35

(58) Field of Classification Search
USPC ...................................................... 705/35–45
See application file for complete search history.

(56) References Cited

U.S. PATENT DOCUMENTS 3,792,462 A    2/1974    Casey et al.
4,674,044 A    6/1987    Kalmus
4,750,135 A    6/1988    Boilen (Continued)

FOREIGN PATENT DOCUMENTS

EP    388162 A2    9/1990
EP    1067471      1/2001

(Continued)

OTHER PUBLICATIONS eSpeed's Supplemental Invalidity Contentions, May 25, 2007.

(Continued)

*Primary Examiner* — Richard C Weisberger
(74) *Attorney, Agent, or Firm* — McDonnell Boehren Hulbert & Berghoff LLP

(57) ABSTRACT

A system and methods for automatic scalping in an electronic trading environment are presented. According to one embodiment, a trading application may display an indicator associated with a price level based on which a tradable object can be automatically traded. When a scalping application detects a fill associated with a first order, the scalping application may automatically enter a second order to offset a position created with the first order. According to one embodiment, the second order is automatically placed on the market when the inside market moves to a predetermined price level in relation to the displayed indicator.

10 Claims, 6 Drawing Sheets

(56) References Cited

U.S. PATENT DOCUMENTS

| | | |
|---|---|---|
| 4,751,035 A | 6/1988 | McHenry |
| 4,903,201 A | 2/1990 | Wagner |
| 5,038,284 A | 8/1991 | Kramer |
| 5,077,665 A | 12/1991 | Silverman |
| 5,101,353 A | 3/1992 | Lupien |
| 5,136,501 A | 8/1992 | Silverman |
| 5,243,331 A | 9/1993 | McCausland et al. |
| 5,270,922 A | 12/1993 | Higgins |
| 5,297,031 A | 3/1994 | Gutterman |
| 5,297,032 A | 3/1994 | Trojan |
| 5,339,392 A | 8/1994 | Risberg et al. |
| 5,619,631 A | 4/1997 | Schott |
| 5,675,746 A | 10/1997 | Marshall |
| 5,689,651 A | 11/1997 | Lozman |
| 5,689,652 A | 11/1997 | Lupien et al. |
| 5,768,158 A | 6/1998 | Adler |
| 5,774,877 A | 6/1998 | Patterson |
| 5,774,878 A | 6/1998 | Marshall |
| 5,793,301 A | 8/1998 | Patterson |
| 5,797,002 A | 8/1998 | Patterson |
| 5,809,483 A | 9/1998 | Broka |
| 5,845,266 A | 12/1998 | Lupien |
| 5,873,071 A | 2/1999 | Ferstenberg |
| 5,915,245 A | 6/1999 | Patterson |
| 5,924,082 A | 7/1999 | Silverman |
| 5,924,083 A | 7/1999 | Silverman |
| 5,926,801 A | 7/1999 | Matsubara |
| 5,946,667 A | 8/1999 | Tull |
| 5,950,177 A | 9/1999 | Lupien et al. |
| 5,960,411 A | 9/1999 | Hartman et al. |
| 5,963,923 A | 10/1999 | Garber |
| 5,966,139 A | 10/1999 | Anupam et al. |
| 6,012,046 A | 1/2000 | Lupien |
| 6,014,643 A | 1/2000 | Minton |
| 6,035,287 A | 3/2000 | Stallaert |
| 6,073,115 A | 6/2000 | Marshall |
| 6,073,119 A | 6/2000 | Bornemisza-Wahr et al. |
| 6,098,051 A | 8/2000 | Lupien |
| 6,115,698 A | 9/2000 | Tuck et al. |
| 6,131,087 A | 10/2000 | Luke |
| 6,134,535 A | 10/2000 | Belzberg |
| 6,161,098 A | 12/2000 | Wallman |
| 6,188,403 B1 | 2/2001 | Sacerdoti et al. |
| 6,195,647 B1 | 2/2001 | Martyn |
| 6,272,474 B1 | 8/2001 | Garcia |
| 6,278,982 B1 | 8/2001 | Korhammer |
| 6,282,521 B1 | 8/2001 | Howorka |
| 6,317,727 B1 | 11/2001 | May |
| 6,343,278 B1 | 1/2002 | Jain |
| 6,366,293 B1 | 4/2002 | Hamilton et al. |
| 6,408,282 B1 | 6/2002 | Buist |
| 6,421,653 B1 | 7/2002 | May et al. |
| 6,516,303 B1 | 2/2003 | Wallman |
| 6,697,099 B2 | 2/2004 | Smith |
| 6,766,304 B2 | 7/2004 | Kemp, II et al. |
| 6,772,132 B1 | 8/2004 | Kemp |
| 6,826,553 B1 | 11/2004 | Dacosta |
| 6,839,686 B1 | 1/2005 | Galant |
| 6,876,981 B1 | 4/2005 | Berckmans |
| 6,938,011 B1 | 8/2005 | Kemp |
| 6,993,504 B1 | 1/2006 | Friesen et al. |
| 7,124,424 B2 | 10/2006 | Gordon et al. |
| 7,127,424 B2 | 10/2006 | Kemp, II |
| 7,155,410 B1 | 12/2006 | Woodmansey |
| 7,181,424 B1 | 2/2007 | Ketchum |
| 7,181,425 B1 | 2/2007 | Cha |
| 7,209,896 B1 | 4/2007 | Serkin et al. |
| 7,212,999 B2 | 5/2007 | Freisen et |
| 7,228,289 B2 | 6/2007 | Brumfield |
| 7,243,083 B2 | 7/2007 | Burns et al. |
| 7,305,361 B2 | 12/2007 | Otero et al. |
| 7,389,264 B2 | 6/2008 | Kemp, II et al. |
| 7,389,268 B1 | 6/2008 | Kemp |
| 7,401,046 B2 | 7/2008 | Hollerman et al. |
| 7,406,444 B2 | 7/2008 | Eng et al. |
| 7,418,422 B2 | 8/2008 | Burns |
| 7,437,325 B2 | 10/2008 | Kemp, II et al. |
| 7,447,655 B2 | 11/2008 | Brumfield |
| 7,496,535 B2 | 2/2009 | Otero et al. |
| 7,505,932 B2 | 3/2009 | Kemp, II et al. |
| 7,509,276 B2 | 3/2009 | Brumfield |
| 7,512,561 B2 | 3/2009 | Burns |
| 7,533,056 B2 | 5/2009 | Friesen et al. |
| 7,562,038 B1 | 7/2009 | Brumfield |
| 7,571,136 B2 | 8/2009 | May |
| 7,577,602 B2 | 8/2009 | Singer |
| 7,587,357 B1 | 9/2009 | Buck |
| 7,613,649 B2 | 11/2009 | Brouwer |
| 7,613,651 B1 | 11/2009 | Buck |
| 7,664,695 B2 | 2/2010 | Cutler |
| 7,676,411 B2 | 3/2010 | Kemp, II et al. |
| 7,680,721 B2 | 3/2010 | Cutler |
| 7,680,724 B2 | 3/2010 | Kemp |
| 7,685,055 B2 | 3/2010 | Brumfield |
| 7,693,768 B2 | 4/2010 | Kemp, II et al. |
| 7,707,086 B2 | 4/2010 | Burns et al. |
| 7,720,742 B1 | 5/2010 | Mauro et al. |
| 7,725,382 B2 | 5/2010 | Kemp, II et al. |
| 7,813,996 B2 | 10/2010 | Kemp, II et al. |
| 7,818,247 B2 | 10/2010 | Brumfield et al. |
| 7,870,056 B2 | 1/2011 | Ketchum et al. |
| 7,890,414 B2 | 2/2011 | Brumfield et al. |
| 7,904,374 B2 | 3/2011 | Kemp, II et al. |
| 7,930,240 B1 | 4/2011 | Buck |
| 2002/0023038 A1 | 2/2002 | Fritsch |
| 2002/0035534 A1 | 3/2002 | Buist |
| 2002/0046146 A1 | 4/2002 | Otero et al. |
| 2002/0046149 A1 | 4/2002 | Otero et al. |
| 2002/0046151 A1 | 4/2002 | Otero |
| 2002/0046156 A1 | 4/2002 | Horn et al. |
| 2002/0049661 A1 | 4/2002 | Otero et al. |
| 2002/0055899 A1 | 5/2002 | Williams |
| 2002/0059129 A1 | 5/2002 | Kemp |
| 2002/0073017 A1 | 6/2002 | Robertson |
| 2002/0091611 A1 | 7/2002 | Minton |
| 2002/0099644 A1 | 7/2002 | Kemp |
| 2002/0120551 A1 | 8/2002 | Jones |
| 2002/0138401 A1 | 9/2002 | Allen |
| 2002/0178096 A1 | 11/2002 | Marshall |
| 2003/0004852 A1 | 1/2003 | Burns |
| 2003/0004853 A1 | 1/2003 | Ram |
| 2003/0009411 A1 | 1/2003 | Ram |
| 2003/0023536 A1 | 1/2003 | Hollerman et al. |
| 2003/0023542 A1 | 1/2003 | Kemp et al. |
| 2003/0065608 A1 | 4/2003 | Cutler |
| 2003/0069834 A1 | 4/2003 | Cutler |
| 2003/0083978 A1 | 5/2003 | Brouwer |
| 2003/0097325 A1 | 5/2003 | Friesen |
| 2003/0126065 A1 | 7/2003 | Eng |
| 2003/0200167 A1 | 10/2003 | Kemp |
| 2003/0208424 A1 | 11/2003 | Tenorio |
| 2003/0236737 A1 | 12/2003 | Kemp |
| 2004/0093300 A1 | 5/2004 | Burns |
| 2004/0103054 A1 | 5/2004 | Singer |
| 2004/0117292 A1 | 6/2004 | Brumfield |
| 2005/0010520 A1 | 1/2005 | Dinwoodie |
| 2005/0149429 A1 | 7/2005 | Kemp, II et al. |
| 2005/0262003 A1 | 11/2005 | Brumfield |
| 2006/0195388 A1 | 8/2006 | Kemp, II et al. |
| 2006/0195389 A1 | 8/2006 | Kemp, II et al. |
| 2006/0200405 A1 | 9/2006 | Burns et al. |
| 2006/0259382 A1 | 11/2006 | Kemp, II |
| 2006/0259383 A1 | 11/2006 | Kemp |
| 2006/0259384 A1 | 11/2006 | Schluetter |
| 2006/0259404 A1 | 11/2006 | Brumfield |
| 2006/0259406 A1 | 11/2006 | Kemp, II et al. |
| 2006/0265303 A1 | 11/2006 | Kemp, II |
| 2006/0265304 A1 | 11/2006 | Brumfield |
| 2006/0265305 A1 | 11/2006 | Schluetter |
| 2006/0271475 A1 | 11/2006 | Brumfield |
| 2007/0038554 A1 | 2/2007 | Kemp, II et al. |
| 2007/0038555 A1 | 2/2007 | Kemp, II et al. |
| 2007/0038556 A1 | 2/2007 | Kemp, II et al. |
| 2007/0038557 A1 | 2/2007 | Kemp, II et al. |

(56) References Cited

U.S. PATENT DOCUMENTS

| | | |
|---|---|---|
| 2007/0136182 A1 | 6/2007 | Ketchum et al. |
| 2010/0138335 A1 | 6/2010 | Brumfield et al. |
| 2010/0332380 A1 | 12/2010 | Kemp, II et al. |
| 2011/0153486 A1 | 6/2011 | Kemp, II et al. |
| 2011/0161223 A1 | 6/2011 | Buck |

FOREIGN PATENT DOCUMENTS

| | | |
|---|---|---|
| EP | 1319211 B1 | 6/2003 |
| JP | 6504152 A | 5/1994 |
| JP | H10301870 A | 11/1998 |
| WO | 90/11571 A1 | 10/1990 |
| WO | WO 91/14231 | 9/1991 |
| WO | 92/12488 A1 | 7/1992 |
| WO | 93/15467 A1 | 8/1993 |
| WO | WO 95/26005 | 9/1995 |
| WO | 98/13778 A1 | 4/1998 |
| WO | WO 98/49639 | 11/1998 |
| WO | 99/13424 A1 | 3/1999 |
| WO | WO 99/19821 | 4/1999 |
| WO | 99/24945 A1 | 5/1999 |
| WO | WO 99/30259 | 6/1999 |
| WO | WO 99/53424 | 10/1999 |
| WO | WO 00/52619 | 9/2000 |
| WO | WO 00/62187 | 10/2000 |
| WO | WO 00/64176 | 10/2000 |
| WO | WO 00/65510 | 11/2000 |
| WO | WO 01/01077 | 1/2001 |
| WO | 01/22266 A2 | 3/2001 |
| WO | 01/22315 A2 | 3/2001 |
| WO | WO 01/16830 | 3/2001 |
| WO | WO 01/16852 | 3/2001 |
| WO | WO 01/22315 | 3/2001 |
| WO | WO 01/27843 | 4/2001 |
| WO | 01/63520 A1 | 8/2001 |
| WO | WO 01/65403 | 9/2001 |
| WO | WO 01/71557 | 9/2001 |
| WO | WO 01/88808 | 11/2001 |
| WO | 00/62187 A3 | 12/2001 |
| WO | 01/22315 A3 | 1/2002 |
| WO | WO 02/15461 | 2/2002 |
| WO | 02/33635 A1 | 4/2002 |
| WO | WO 02/29686 | 4/2002 |
| WO | WO 02/33621 | 4/2002 |
| WO | WO 02/33623 | 4/2002 |
| WO | WO 02/33636 | 4/2002 |
| WO | WO 02/33637 | 4/2002 |
| WO | 01/16852 A8 | 6/2002 |
| WO | WO 02/48945 | 6/2002 |
| WO | WO 02/059815 | 8/2002 |
| WO | WO 02/069226 | 9/2002 |
| WO | WO 02/079940 | 10/2002 |
| WO | WO 02/093325 | 11/2002 |
| WO | WO 02/103601 | 12/2002 |
| WO | WO 03/017062 | 2/2003 |
| WO | 03/090032 A3 | 10/2003 |
| WO | WO 03/090032 | 10/2003 |

OTHER PUBLICATIONS eSpeed's Disclosure of Invalidity Contentions Pursuant to 35 USC 282, May 25, 2007.
Invalidity Contentions Re: TradePad Module (Letter Dated May 25, 2007).
Supplemental Invalidity Contentions Pursuant to 35 U.S.C. 282, Aug. 10, 2007.
eSpeed's and Ecco's Answers to Plaintiff's Eighth Set of Interrogatories, Aug. 4, 2006.
eSpeed and Ecco's Supplemental Answers to Plaintiff's First, Third, Seventh, Eighth, and Ninth Set of Interrogatories, May 25, 2007.
Defendant GL Trade Americas, Inc's Supplemental Responses and Objections to Interrogatory Nos. 5,17, and 18,Jul. 24, 2006.
eSpeed's Objections and Answers to Plaintiff's Third Set of Interrogatories to Defendant eSpeed, May 12, 2005.
GL WIN Version 4.50, Mar. 3, 1999, OX 538, G 107459-G 107480, DTX 538.
Trading Pad User Manual, Aug. 10, 1999, OX 539, G 112123-G 112131, DTX 539.
Email from Wattier to M. Cartier attaching Matif VF: V4.50 manual, Mar. 30, 1998, OX 592, MC000046-MC000116, OTX 592.
User Guide V4.60 LIFFE Connect for Futures by GL Trade, Jun. 1999, OX 605, G 123548-G 123603, OTX 605.
"A System and Method for Conducting Security Transactions Over a Computer Network", Mauro & Buist, Mar. 1, 1999, DX 196, eS 066150-eS 066229, DTX 196.
RCG's Presentation re WitCapital, Apr. 22, 2004, OX 208, RCG 000635-RCG 000663, OTX 208.
Mauro, Certified U.S. Appl. No. 09/292,552, Apr. 15, 1999, OX 209, eS 065994-eS 066149.
Various declarations Re: U.S. Appl. No. 09/292,552, Nov. 3, 2003, OX 284, TT 099877-TT 099907, OTX 284.
Evenstreet Presentation prepared for National Discount Brokers, 1999, DX 301, CM 006787-CM 006817, DTX 301.
WIT OSM user interface instructions, Aug. 6, 1998, OX 427, CM 006591-CM 006632, OTX 427.
Presentation re WIT DSM user interface Trade4.ppt, Oct. 12, 1998, DX 430, CM 008265-CM 008330, DTX 430.
WIT DSM Presentation re Information display and decision variables, Dec. 20, 1998, DX 431, CM 004334-CM 004347, DTX 431.
Evenstreet Presentation prepared for Flatiron Partners, 1999, OX 437, CM 007139-CM 007172, DTX 437.
WIT Capital digital trading facility presentation to Goldman Sachs, DX 438, CM 004523-CM 004547, DTX 438.
WIT Capital Digital trading facility presentation to PaineWebber, Inc., OX 439, DX 439.
WIT Capital after hours trading system, Mauro, Mar. 19, 1999, OX 440, CM 009028-CM 009059, DTX 440.
WIT Capital Corporation digital trading facility presentation, Mar. 1999, OX 441, DTX 441.
WIT Capital pdf operator manual for Digital trading facility, 1999, OX 442, CM 00651 O-CM 006513, DTX 442.
Overview re Digital trading facility, OX 443, CM 006315-CM 006344, DTX 443.
Utility Patent Application Transmittal Re: Computer Trading System, Method and Interface, Apr. 15, 1999, Mauro, Kleia, and Buist, PX368.
Photocopy of Disks containing exhibits A and B to declaration of W. Buist, PX366.
SISS Functional specifications version 2.1, Feb. 16, 1988, OX 445, DTX 445.
Overview re SPATS; the Electronic Broker, OX 446, DTX 446.
Status review specialist support system study NYSE, Apr. 10, 1986, OX 447, DTX 447.
Declaration of W. Buist re: WIT DSM System, Apr. 26, 2006, PX 365, DTX 1777.
Sample screens of APT system, OX 150, DTX 150.
Photo of trader w/ APT screen, OX 151 , LI FFE 00167-LI FFE 00168, DTX 151.
APT User Guide, Jan. 1994, OX 152, LIFFE 000262-LIFFE 000363, DTX 152.
LIFFE guide/pamphlet, OX 148, DTX 148.
Release Notes—Market Trader V5.2a, Mar. 18, 1999, OX 617, G 118137-G 118152,DTX617.
Market Trader—Nikkel 225 & Nikkel 300 Index options and Index futures trading users guide, Mar. 20, 1998, OX 618, G1 00444-G1 00462, DTX 618.
Midas Kapiti Delivery Note and Release Note-Market Trader V5.2b, Mar. 31, 1999, OX 619, G 096511-G 096527, DTX 619.
Midas Kapiti Release Notes—Market Trader V5.2e, Apr. 12, 1999, OX 620, G 096694-G 096711, DTX 620.
Midas Kapiti Release Notes—Market Trader V5.2, OX 621, G 096712-G 096727, DTX 621, OS/26/99.
Midas Kapiti Release Notes—Market Trader V5.2e, OX 622, G 096728-G 096754, DTX 622, Jun. 1, 1999.
Midas Kapiti Delivery Note and Release Note—Market Trader V5.2e, OX 623, G 105641-G 105667, DTX 623,May 26, 1999.
Drawing of 1997 TSE terminal by H. Kida, OX 624, DTX 624.

(56) References Cited

OTHER PUBLICATIONS

Directory of Software Solutions for LIFFE Connect, 02/0099, OX 156, DTX 156.
ScreenShots: Patsystem "Canned" Demo, Feb. 1997, OX 120, PATS 00545-PATS 00559, DTX 120.
PTS Client Version 2.1 F, OX 119, PATS 00067-PATS 00082, DTX 119.
PTS trading application Version 1.1 Beta H.1, Mar. 31, 1998, OX 118, PATS 00560-PATS 00560, DTX 118.
Directory of Software Solutions for LI FFE Connect, Issue 1, Oct. 1998, OX 155, DTX 155.
Directory of Software Solutions for LIFFE Connect, Issue 3, Jun. 10, 1999, OX 157, DTX 157.
Trading Technologies Trader System User Documentation, Apr. 1, 1998, Release 3.10, OX 3, TT 015867-TT 015955, DTX 3.
Aurora Chicago Board of Trade Brochure, 1990, ES0021230-ES0021241.
Ecco Consulting Study Report MEFF Software Systems, Mar. 17, 1999, ES0060578-ES0060591.
Osaka Stock Exchange Manual (Japanese Document), Apr. 1996 REFCOOO09773- REFCOOO09826.
TSE Manual (Japanese Document), Nov. 15, 2005,DX179,TSE647-995,w/certified translation eS62258-62366 [TSE609-647,694-711,714-721,735-736,749-756,759-760,779-782,784-81 0,982-995].
TIFFE Manual (Japanese Document), Jan. 1996, REFCOO010861-REFC00011210, (translation included as cite No. 175).
Final Detailed Design Document NYMEX Access, May 5, 1992, eSOO03127-eSOO03541.
The Application Program Interface (API) Reference Manual for LIFFE Connect, Release 3.0, Sep. 1998, DDX 159, DTX 159, eSOO060055-eSOO060145.
The Application Program Interface (API) Reference Manual for LIFFE Connect, Release 3.2, Dec. 1998, DDX 161, DTX 161, eSOO060239-eSOO060331.
The Application Program Interface (API) Reference Manual for LIFFE Connect, Release 3.3, Jan. 1999, DDX 162, DTX 162, eSOO059959-eSOO060054.
The Application Program Interface (API) Reference Manual for LIFFE Connect, Release 2.7,Sep. 1998, DDX 163, DTX 163, eSOO059868-eSOO059958.
OM Click Trade User's Guide for Windows NT, Oct. 1998, eSOO064671-eSOO064773.
GLOBEX Members Handbook, Jun. 1992, DX632, DTX632, eS006974-eS0069818.
The Complete GLOBEX2 Handbook, May 1998, DX635, DTX635, CME-E001 0679-001 0891.
The Complete GLOBEX2 Handbook, Jul. 1998, DX637, DTX637, CME-E 014048-CME-E 014286.
MINEX Service Outline User Test/Orientation, Sep. 1992, eS0064647-eS0064670.
ORC Instructions for Use Version 2.2.8., 1999, eS0064775-eS0032572.
Interactive Brokers, "Trade Futures Online with Interactive Brokers", May 9, 2005, eS0032571-eS0032572.
Nicholas Economides, "Electronic Call Market Trading", Journal of Portfolio Management, Feb. 1995, eS0069585-eS006961 0.
GL Trading Pad Manual, G0020819-G0020826.
TradePad Instructions (French), G0025748-G0025749.
TradePad.vsd Document, Feb. 9, 1999, G011169-G0111670.
Trading pad.doc Document, Jan. 26, 1999, G0111671-G0111672.
GL WIN et Logiciels complementaires (French), Oct. 1999, G009121-G009486.
GL WIN et Logiciels complementaires (French), Jul. 1999, G009875-G010238.
Memo re: Dual ACCESS Version 4.5 release, Mar. 21, 1999, G0022956-G0022959.
tradepad.txt (French), Mar. 8, 2000, G0025616-G0025618.
GL Enhancements Software Version 4.11 f, Oct. 29, 1998, G0060853-G0060854.
GL Enhancements Update, Jan. 27, 1999, G01 01682-G01 01688.

LIFFE Connect Futures Release Note 050399.doc, Mar. 3, 1998, G0111402-G0111407.
TradingPad.doc, Apr. 30, 1999, G0112117-G0112122.
TradingPadUserManual.doc, Aug. 10, 1999, G0112123-G0112131.
GL WIN Version 4.51, G0118856-G0118865.
GL Trade Presentation (French), Apr. 25, 1999, G0118989-G0119044.
LIFFE Connect Futures Functional Technical Issues to Resolve, Apr. 12, 2007, G0119049-G0119050.
LIFFE Connect for Equity Options User Guide v4.30, Nov. 1998, G0119052-G0119086.
Member Participation in the Futures Market, Apr. 12, 1999, G0119196-G0119197.
Email from Patricia Gauthier to Sam Page, Jan. 25, 1999, G0119377-G0119380.
LIFFE Connect ISV Circular No. 001.99, Jan. 8, 1999, G0119566-G0119568.
LIFFE Connect ISV Circular No. 14.99,Mar. 2, 1999, G0119583-G0119590.
LIFFE Connect ISV Circular No. 004.99,Jan. 15, 1999, G119615-G0119616.
LIFFE Connect ISV Circular No. 001.99, Jan. 15, 1999, G0119617-G0119618.
LIFFE Connect ISV Circular No. 008.98, Dec. 28, 1998, G0119631-G0119632.
Screenshot of GL TradePad, G0119660.
LIFFE Connect for Futures Schedule for Project Deliverables, Feb. 4, 1999, G0119681-G0119682.
LIFFE Connect for Futures-Project Update #1, Meeting of Jan. 11, 1999, G0119691-G0119697.
LIFFE Connect for Futures: Project Update 2, Meeting of Feb. 10, 1999, G0119698-G0119704.
LIFFE Connect for Futures: Project Summary: Apr. 19, 1999, G0119705-G0119717.
Functional Enhancements for LIFFE Connect for Futures Project, Apr. 12, 1999, G0119718-G0119724.
Functional Enhancements for LIFFE Connect for Futures Project, Apr. 12, 1999, G0119725-G0119745.
Functional Enhancements for LIFFE Connect for Futures Project, Mar. 3, 1999.
Installation, Market Entry Test, and Technical Dress Rehearsal Summary, Feb. 23, 1999.
GL Trade Checklist-Installation Requirements for Futures, Jan. 1999, G0119795-G0119798.
Cahier de charges.doc, Feb. 9, 1999, G0111752-G0111758.
Keyboard example, Feb. 3, 2006, G007308-G007310.
GL Brochure, G0021652-21658.
GL Cost and Services, 1998, G01 08876.
GL Win Summary (French), Jun. 1998, G0091 004-G0091 046.
Swiss Exchange SWX-TS User Manual, Dec. 31, 1998, DTX 2215, eS0032293-S0032547.
Screen No. 1 OO-Order Book & Order Entry 1 (Single View), eS060637-eS060639.
GLOBEX User Guide, Jan. 1997, DDX 633, DTX 633, eS069819-eS070081.
QuickTrade Document and Brochure, G021 027-21 031.
LIFFE Connect for Futures User Guide v4.5, Jun. 1999, G0025751-25806.
GL Version 4.70 (French Version), Jan. 5, 2000, G0026505-26533.
GL Version 4.70 (English Version), Jan. 5, 2000, G0020593-20621.
GL WIN and Related Software Manual, Sep. 11, 2000, 1) G0025251-25615.
GL WIN and Related Software Manual, 2) G0025942-26267.
GL WIN and Related Software Manual, 3) GO1 0239-1 061 0.
GL WIN et Logiciels complementaires (French), GOO09495-9874.
Internal Product News doc on QuickTrade, G0020468-20471.
"Introducing the Company: GL Trade" product offerings and slide presentation (to Reuters), G0026534-26559.
GL Product Leaflet Re: Mosaic, G0022529-22530.
Thomson Financial leaflet, Sep. 2003, G0022445-22450.
LIFFE Connect for Futures leaflet, G0023885-23888.
TSE Japanese Document, pp. 4-15.
TSE Japanese Document, pp. 6-15.

(56) References Cited

OTHER PUBLICATIONS

Megumi Miyoshi, Japanese Patent Application No. 2001-564025, 4/18/200.
"Amazon.com Catapults Electronic Commerce to Next Level with Powerful New Features," Amazon.com Press Release, Sep. 23 1997, DTX1034, DezmelykOOO012-13.
Apple Advertisement, Scientific American, Sep. 1984, Scientific American Inc. NY, NY DezmelykOOO014-33.
Memo Re: Downloading the Terminal Program, Aug. 18, 2005.
"Specialist vs Saitori: Market-Making in New York and Tokyo", Richard Lindsay and Ulrike Schaede, DTX 1170, Jul.-Aug. 1992, SilvermanOO0494-SilvermanOO0506.
"Building for Excellence", MINEX Brochure, DTX 1153, SilvermanOO0330-SilvermanOO0334.
Chicago Mercantile Exchange (CME) Brochure, DTX1163, SilvermanOO0406-SilvermanOO0407.
MEFF Renta Fija Manual, DTX 1165, Oct. 1997, SilvermanOO0410-SilvermanOO0473.
O'Hara and Oldfield, "The Microeconomics of Market Making", Journal of Financial and Quantitative Analysis, Dec. 1986, DTX 1169 Silverman000478-SilvermanOO0493.
Terminal Use Manual—Windows NT Version, Tokyo International Financial Futures Exchange (TIFFE), 1994, Silverman002552-Silverman002616, DTX 1226.
USPTO Press Release, "Electronic Patent Application Records Replace Paper Files at USPTO", OTX 2285,Sep. 19, 2007.
Memorandum Opinion and Order Re: '132 and '304 Claim Construction [425], Oct. 31, 2006.
Memorandum Opinion and Order Re: TT's Motion for Clarification [475], Feb. 21, 2007.
Memorandum Opinion and Order Re: Non-Infringement [708], Jun. 20, 2007.
Memorandum Opinion and Order Re: Motions for Reconsideration [875], Aug. 27, 2007.
Memorandum Opinion and Order Re: "Single Action" Ruling [963], Sep. 12, 2007.
Memorandum Opinion and Order Re: Preliminary Injunction [83], Feb. 9, 2005.
Memorandum Opinion and Order Re: eSpeed's Motion for Summary Judgment of Invalidity Denied [845], Aug. 21, 2007.
Memorandum Opinion and Order Re: TT's Motion to Preclude Prior Sale Defense Denied [873], Aug. 27, 2007.
Memorandum Opinion and Order Re: GL's Motion for Reconsideration Denied [994], Sep. 19, 2007.
Memorandum Opinion and Order Re: Priority Date [769], Jul. 12, 2007.
Memorandum Opinion and Order Re: Priority Date [1013], Sep. 25, 2007.
Memorandum Opinion and Order Re: Prior Public Use [835], Aug. 16, 2007.
Memorandum Opinion and Order Re: Defendant's Motion for Judgment as a Matter of Law on Indefiniteness [1141], Jan. 2, 2008.
Notification of Docket Entry Re: Defendants eSpeed's Motion for Judgment as a Matter of Law on Invalidity is denied [1140], Jan. 3, 2008.
Notification of Docket Entry Re: Defendant eSpeed's Motion for a New Trial is denied [1142], Jan. 3, 2008.
Memorandum Opinion and Order Re: Defendant's Motion for Judgment as a Matter of Law on Willfulness [1144], Jan. 3, 2008.
Deposition testimony of Hiroyuki Kida dated May 17, 2007 and May 18, 2007 with DDX 617-624, POX 519-524 and POX 531.
Trial testimony of Hiroyuki Kida dated Sep. 28, 2007 and Oct. 1, 2007 with DTX 617.
Deposition testimony of Atsushi Kawashima dated Nov. 21, 2005 with DDX 178-185.
Trial testimony of Atsushi Kawashima dated Sep. 26, 2007 with DTX 183.
Deposition testimony of Philip Carre dated Jun. 22, 2007, Sep. 6, 2007 & Sep. 13, 2007 with DDX 384-385; 473;494; 527;537-541; 592; 593A; 595-598; 605; 626; 629; 719-723; 728-732; 897-898; 896.
Deposition testimony of Michael Cartier dated May 9, 2007 with DDX 587-588; DDX 592-593A and POX 498-500.
Deposition testimony of Cristina Dobson dated May 18, 2007 with DDX 625-635; DDX 637; POX 533 and POX 535.
Deposition testimony of Nicholas Garrow dated Jun. 14, 2007 with DDX 116 and DDX 592.
Trial testimony of Nicholas Garrow (via expert witness) dated Oct. 2, 2007.
Deposition testimony of Michael Glista dated Feb. 20, 2007 with DDX 382-386.
Trial testimony of Michael Glista dated Sep. 24, 2007 and Sep. 25, 2007 with DTX 382-386; DTX 524; DTX 570; DTX 579; DTX 592; DTX 3020; DTX 3050; DTX 3057; DTX 3110; PTX 1993; PTX 2065; PTX 2092; PTX 2094.
Deposition testimony of Laurent Havard dated Apr. 24-26, 2007, May 12, 2007, Jun. 21, 2007 and Sep. 5, 2007 with DDX 506; DDX 508; DDX 517; DDX 539; DDX 551-568; DDX 570-573; DDX 575; DDX 603; POX 462; POX 464-483; POX 767-769; POX 771-774; POX 875-877; POX 882-888 and POX 893.
Trial Testimony of Laurent Havard dated Sep. 21, 2007 with DTX 384, DTX 520; DTX 561-62; DTX 570; DTX 573; DTX 575; DTX 593; DTX 750-52; DTX 3011; DTX 3017-18; DTX 3050; PTX 575; PTX 2064; PTX 2074; PTX 2077; PTX 2079.
Deposition testimony of Jean Cedric Joliant dated Apr. 26, 2007 and Jun. 13, 2007 with DDX 384; DDX 517; DDX 520; DDX 551-568; DDX 575-577; PDX 465-483.
Trial Testimony of Jean Cedric Jollant dated Sep. 20, 2007 with DTX 157; DTX 473; DTX 719; DTX551-64; DTX598; DTX722; DTX 1903; DTX3009-10; DTX3014; DTX3016-18; DTX 3020; DTX 3023; DTX 3025; PTX 166; PTX 520; PTX 526; PTX 539; PTX 573; PTX 575; PTX 579; PTX 2065.
Deposition testimony of Marc Lorin dated Sep. 5, 2007, with DDX 385; DDX 721-722; DDX 730.
Deposition testimony of Christopher Malo dated May 23, 2007 with DDX 524.
Deposition testimony of Fred Mastro dated May 21, 2007 with DDX 638; POX 538; POX 540-543.
Trial testimony of Fred Mastro dated Sep. 25, 2007 with DTX 592.
Deposition testimony of William McHorris dated Apr. 10, 2007 with POX 416-417.
Deposition testimony of Josephine Sheng dated Jun. 26, 2007 with DDX 520; DDX 522; DDX 536; DDX 575; POX 493; POX 683-683a; POX 775.
Deposition testimony of Bruno Spada dated Apr. 30, 2007 and May 2, 2007 with DDX 384-385; DDX 519-21; DDX 537-38; DDX 579-580; DDX 522; DDX 538; PDX 493-495; PDX 519-522.
Trial testimony of Bruno Spada dated Sep. 24, 2007 with DTX 306; DTX 384; DTX 518-522; DTX 524; DTX 575; DTX 579-580; DTX 593; DTX 626; DTX 628; DTX 646; DTX 1899 DTX 2086; DTX 3020-3021; DTX 3058-3059; DTX 3061; DTX 3085; PTX 737; PTX 840; PTX 2083; PTX 2087; PTX 2099; PTX 2101.
Deposition testimony of Marcel Tchitchiama dated May 10, 2007-May 11, 2007 with DDX 156-157; DDX 168; DDX 384-85; DDX 538; DDX 592-93A; DDX 595-98; DDX 602-06; DDX 608-11 DX 494; POX 503; POX 506; POX 612.
Deposition testimony of Neil Treloar dated Jun. 19, 2007 with DDX 384; DDX 539-39A; DDX 724; DDX 726; POX 492; POX 750-752.
Trial testimony of Neil Treloar dated Sep. 21, 2007 and Sep. 24, 2007 with DTX 2040-2042.
Trial testimony of Gerard Varjacques dated Sep. 28, 2007 with PTX 509-510 and PTX 513.
Deposition testimony of Amy Watson dated Jun. 12, 2007 with DDX 626A; DDX 700 and POX 636.
Deposition testimony of Barbara Wattiez dated Jun. 16, 2007 with DDX 719-723.
Trial testimony of Barbara Wattiez dated Sep. 28, 2007 with DTX 592-593A; DTX 597-598; DTX 718-719; DTX 722.
Deposition testimony of Christopher Buist dated Jun. 22, 2006 with POX 358-364 and DDX 283-284.

(56) References Cited

OTHER PUBLICATIONS

Deposition testimony of Walter Buist dated Jun. 23, 2006 with DDX 315; POX 310-315; POX 365 and POX 368-370.
Digital trading facility weekly operations meeting outline, OX 444, DTX 444, CM 006661-CM 006661,May 10, 1999.
Chart re DSM QA Test Plain—project plan in progress, OX 432, DTX 432, Nov. 4, 1998.
User interface design specification for WIT capital digital stock market, OX 433, DTX 433 CM 008441-CM 008478, Jan. 18, 1999.
Updated negotiations design to E. Lang from C. Mauro for review and approval prior to patent application, OX 434, CM 008410-CM 008414, DTX 434,Jan. 18, 1999.
Notes re final additions/revisions, OX 435, CM 007949-CM 007955, DTX 435, Apr. 2, 1999.
Position paper: On-line training and customer acquisition; WIT Capital DSM product launch and related schedule to E. Lang, DX 436, DTX 436, CM 006580-CM 006590, Feb. 22, 1999.
Meeting outline, OX 428, CM 00750-CM 007501, DTX 428,Sep. 11, 1998.
Presentation re WIT Capital Digital stock market Phase 1 usability and customer response testing: Preliminary report of findings, DX 429, CM 007446-CM 007466, May 1, 2006.
WIT Capital limit order book to L. Forrest from C. Mauro, OX 425, CM 007382-CM 007411, DTX 425,Apr. 20, 1998.
User Interface Design for display options design, OX 426, CM 000249-CM 000287, DTX 426,Jul. 8, 1998.
Letter from EPO to TT Re: Five Recently Filed European Patent Oppositions, Feb. 21, 2006.
Notice of Opposition to a European Patent EP 1319211 B 1, An ITRA Medienprojekte GmbH, Jan. 13, 2006.
Notice of Opposition to a European Patent by Deutsche Borse AG Jan. 12, 2006.
Notice of Opposition to a European Patent by EccoWare Ltd., Jan. 13, 2006.
Notice of Opposition to a European Patent by Rosenthal Collins Group LLC, Jan. 12, 2006.
Notice of Opposition to a European Patent by Tick-It GmBh, Jan. 13, 2006.
Declaration of Walter Buist, Exhibit 17, Apr. 26, 2007; with Faxed Signature Page.
Letter from J. Walaski to the EPO Re: Change of Address, Dec. 19, 2006.
A. Klein, WaliStreet.com- Fat Cat Investing at the Click of a Mouse, Chapt. 14 "Finding Gold in Tribeca", 1998; Exhibit 16.
A. Klein, WaliStreet.com- Fat Cat Investing at the Click of a Mouse, Chapt. 14-16, 18, 23, 1998; Exhibit 16 (Cont'd).
WIT Digital Stock Market, User Interface Rev. 9, Exhibit 15.
Opposition Trading Technologies, Inc. Application No. 01920183.9 EP 1319211 Bl, Exhibit 4 (Japanese and English Versions), Sep. 1997.
System for Buying and Selling Futures and Options Transaction Terminal Operational Guidelines, TSE Business Systems Dept., TSE647-995, eS062297-eS062380.
Letter from EPO to TT Re: Further European Patent Opposition, Feb. 23, 2006.
Letter from EPO to TT Enclosing European Patent Oppositions, Jan. 25, 2006.
Opposition TT, EP 1 319211 B1, Copy set 1, Annex One-Grounds of Opposition, Jan. 19, 2006.
Deposition Transcript of Atsushi Kawashima, Nov. 21, 2005, Opposition EP 1 319 211 B1 Exhibit 3.
The Application Program Interface (API) Reference Manual for LIFFE Connect, Sep. 1998, release 3.1, EP 1 319211 B1 Exhibit 7A, e80060146-e80060237.
Deposition Transcript of Paul MacGregor, Nov. 1, 2005, Opposition EP 1 319 211 B1 Exhibit 9A.
APT Trading Procedures (ATOM Version) of LI FFE, Apr. 3, 2001, Opposition EP 1 319211 B1 Exhibit 9B.
APTpius Trading Procedures, Dec. 28, 1995, Opposition EP 1 319211 B1 Exhibit 90.
IRIS Investment Support Systems Window Ad, Opposition EP 1 319211 B1 Exhibit 10.
Fig.2 Substitute Sheet (Rule 26), Opposition EP 1 319 211 B1 Exhibit 13A.
U.S. Appl. No. 60/186,322, Opposition EP 1 319211 B1 Exhibit 13B.
LIFFE's New Electronic Trading Platform for Futures, LIFFE 202-261, Opposition EP 1 319211 B1 Exhibit 80.
TIFFE Internet Article, "New On-Screen Trading Terminals", E2.
System for Buying and Selling Futures and Options Transaction Terminal Operational Guidelines, TSE Business Systems Dept, TSE00647-81 0, eS0622977-eS062366, D1 (2).
ORC Instructions for Use, Version 2.2.8., 1999.
Futures/Options Trading System Guidelines for Operating the Trading Terminals, TSE Business Systems Dept, TSE00628-643, eS062278-eS062293, 01 (3).
Securities Industries News, "TT Upgrades Software Platform", Aug. 28, 2000 (06).
Letter to EPO from Karl Barnfather Enclosing Notice of Opposition (form 2300.1) and Grounds of Opposition (Annex 1),Jan. 12, 2006.
Dow Jones & Reuters Factiva, "Firms Rush to Make LI FFE Connect Decision", Dec. 4, 1998, E6.
Dow Jones & Reuters Factiva, "Date Broadcasting Partners with Alltech Investment to Provide Customers with Online Trading", Feb. 25, 1999, E8.
Trading Pad Document (E3).
Japanese Document, TSE00609-627, Dec. 1, 2006 (E5), with Translation.
TT X-Trader Brochure, Dec. 1, 2006 (E7).
Letter to J. Walanski from EPO Re: Payment, Apr. 20, 2005.
Letter to J. Walanski from EPO Re: Decision to Grant TT Patent, Mar. 3, 2005.
German Document from Tick-IT GmbH Filing New European Opposition, Jan. 14, 2006.
Faxed German Document from Tick-IT GmbH Filing New European Opposition, Jan. 13, 2006.
Annex A to TT's Reply Brief.
Annex B to TT's Reply Brief.
Memo Re: Futures/Options Trading System and Japanese Patent Application No. 2001-564025 (Japanese), Aug. 18, 2005.
Patsystems News Rel. Nov. 6, 2001.
Court's ruling on no prior sale.
Memorandum Opinion and Order Re: No prior use.
Memorandum Opinion and Order Re: Inequitable Conduct.
Memorandum Opinion and Order Re: Court Reaffirming Priority.
English Translation of Tokyo Stock Exchange Offer Form, Apr. 18, 2005.
Information Offer Form, Apr. 18, 2005.
Notification of Information Offer Form, Jun. 3, 2005.
GL Trade, CAC and Stoxx Futures on MATIF NSC VF, User Information Notes, pp. 1-14, published by GL Trade, London, England, Mar. 15, 1999.
GL Trade, LIFFE Connect for Futures, User Guide, V4.50 Beta, pp. 1-24, published by GL Trade, London, England, Jan. 1999.
GL Trade, LIFFE Connect for Futures, User Guide, V4.50, pp. 1-39, published by GL Trade, London, England, Feb. 1999.
GL Trade, LIFFE Connect for Futures, User Guide, V4.50, pp. 1-39, published by GL Trade, London, England, Mar. 1999.
GL Trade, LIFFE Connect for Futures, User Guide, V4.51, pp. 1-57, published by GL Trade, London, England, Jun. 1999.
NASDAQ Workstation II User Guide, Guide to Enhancements for NASDAQ Workstation II Software Release (Apr. 1998) as viewed on the Internet Achieves http://web.archive.org/web/20031208041112/nasdaqtrader.com/trader/tradingservices/productservices/userguides/nwliguide.pdf.
International Search Report for PCT/US03/12201.
Office Action issued by the USPTO on Jun. 26, 2007 for U.S. Appl. No. 11/417,871.
Pending U.S. Appl. No. 10/403,757, filed Mar. 31, 2003.
Pending U.S. Appl. No. 10/125,894, filed Apr. 19, 2002.
Pending U.S. Appl. No. 10/403,881, filed Mar. 31, 2003.
MLT Trade Vizion, http//www.trade-vizion.com/modules.php?name+Products —Jul. 29, 2004.

(56) References Cited

OTHER PUBLICATIONS

Office Action issued by the USPTO on Mar. 2, 2007 for U.S. Appl. No. 10/125,894.
USPTO Presentation, NASDAQ, Nov. 8, 2001.
Kharouf, A Trading Room with a View, Futures, 27, Nov. 11, 1998.
www.tradingtechnologies.com/products/xtrade_full.html (viewed May 22, 2001) Jun. 9, 2000.
English Translation of TSE "Publication 3".
English Translation of TSE Document 1.
REFCO English Translation of TSE "Publication 1".
REFCO English Translation of TSE "Publication 2".
REFCO English Translation of TSE "Publication 3".
Search Report issued by the Australian Patent Office for SG 200406082-8.
APT Brochure, LIFFE Exchange, circa 1990.
Trading Screen, INTEX of Bermuda, circa 1984.
Weber, Information Technology in the Major International Financial Markets, Apr. 7, 1993.
Trading Screen, TIFFE Exchange, circa 1989-1990.
Trading Screen, MEFF Exchange, circa 1990.
Cavaletti, Order Routing Article, Futures Magazine, Feb. 1997.
Aurora Article, CBOT, circa 1989.
Market Watch, Trading Screen, date not available.
Trading Technologies, "X_TRADER 6.0", Jun. 22, 2001. [Retrieved from the Internet on Feb. 3, 2010: http://web.archive.org/web20010622135748/http://www.tradingtechnologies.com/products/xtrader.htm].
One Click Trading Options, Trading Technologies, circa 1998.
Trading Screen, SWX Exchange, circa 1990.
Expanding futures and options trading around the world, around the clock, GLOBEX, circa 1989.
Hansell, The computer that ate Chicago, Institutional Investor, Feb. 1989.
Globex Report: An update on the CME Global electronic exchange, Feb. 10, 1989.
NYMEX Access Documents, New York Mercantile Exchange, Feb. 28, 1992.
CATS Traders' Manual, Toronto Stock Exchange, Sep. 30, 1977.
Grummer, Peake, Sellers, Preliminary Feasibility Study, Bermudex Ltd., Nov. 1980.
Peake, Mendellson, The ABCs of trading on a national market system, Appendix C of Preliminary Feasibility Study, Bermudex Ltd., Sep. 1997.
Peake, The last 15 meters, Appendix E of Preliminary Feasibility Study, Bermudex Ltd., Jun. 15, 1997.
Declaration of Brendan Bradley in Case No. 04 C 5312, Nov. 18, 2004.
Memorandum Opinion Published Feb. 9, 2005, of Judge James B. Moran in Case No. 04 C 5312.
Tokyo Stock Exchange ("TSE"), Publication 1, Sep. 1997.
Tokyo Stock Exchange, "Publication 2", Aug. 1998.
Tokyo Stock Exchange, Publication 3, Jul. 31, 2000.
Tokyo Stock Exchange, Document 1, Jan. 2000.
English Translation of TSE "Publication 1".
English Translation of TSE "Publication 2".
EPO Comments to Opposition to European Patent EP 1319211 dated Dec. 1, 2010 (67 pages).
Singapore Application No. 2004-06082-8, Corrected Search Report and Written Opinion issued by Australian Patent Office (dated Feb. 7, 2006) (8 pages).
Trading Technologies, "X_TRADER 6.0", Jun. 22, 2001. [Retrieved from the Internet on Feb. 3, 2010: http://web.archive.org/web20010622135748/http://www.tradingtechnologies.com/products/xtrader. htm].
Memorandum Opinion and Order issued by Judge Virginia M. Kendall in *Trading Technologies International, Inc.* v. *BCG Partners, Inc.*, Case 1:10-cv-00715, dated Feb. 9, 2012.
Allen, A., and Zarembo, L., "The Display Book: The NYSE Specialists' Electronic Workstation" in The Challenge of Information Technology For The Securities Markets: Liquidity, Volatility, and Global Trading, Eds. Henry C. Lucas Jr. And Robert A. Schwartz, p. 205-213, alleged available as of 1989, G0176623-G0176633.
Australian Patent Office Search and Examination Report for Singapore Patent Application No. 200405020-9 dated Aug. 2, 2007, mailed Aug. 7, 2007.
Automated Trader Journal, Q4 2007, alleged available as of Oct. 1, 2007, DDX_Buhannic 010.
BNA, Inc. Securities Regulation & Law Report, "Possibility of 'After Hours' Trading Raises Liquidity, Other Concerns for SEC" vol. 31, No. 16, Apr. 23, 1999, ISSN 1522-8797 [Retrieved from the Internet at http://pubs.bna.com on Apr. 19, 2007], DDX 550.
Broker Workstation handwritten notes, alleged available as of Mar. 1, 1991, G0173819-0173920.
Buist invoice to eSpeed, alleged available as of Feb. 8, 2006, PDX 955.
CBOT Broker Workstation Functional Specification, alleged available as of Mar. 6, 1991, G0173785-0173818.
Chicago Mercantile Exchange, CUBS (CME Universal Broker Station) Brochure, alleged available as of Feb. 1, 1997, CME-E0000699-0000700.
Clemons, E., and Weber, B., "Alternative Securities Trading Systems: Tests and Regulatory Implications of the Adoption of Technology," Information Systems Research, vol. 7, No. 2, alleged available as of Jun. 1996, G0031593-0031618.
CME Group, CME Globex Access Directory, alleged available as of Jan. 1, 2008, G0137650-0137727, DDX_Buhannic 011.
Comparison of BTQPane.java files, alleged available as of Jun. 18, 1998, PDX 957.
CQG, LLC's and CQG, INC.'s Initial Invalidity and Unenforceability Contentions, Civil Action No. 05-cv-4811, dated Jul. 23, 2012.
CQG's Final Invalidity Contentions, Case No. 05-cv-4811, dated May 10, 2013.
Credit Suisse First Boston, PrimeTrade promotional materials and press releases, alleged available as of Jan. 19, 1999, CSFB000036-000046, PDX_Buhannic 001.
Decision on Appeal issued by United States Court of Appeals for the Federal Circuit in *Trading Technologies International, Inc.* v. *Open E Cry, LLC*, Case 2012-1583, dated Aug. 30, 2013.
Declaration of Brian Schneider, Apr. 4, 2011, G0186079-0186081.
Declaration of Gregory Veselica, Mar. 30, 2011, G0186082-0186084.
Declaration of Thomas Cooper, Mar. 22, 2011, G0186076-0186078.
Deposition testimony of Bautz, William dated Apr. 20, 2007 with DDX 550.
Deposition testimony of Buhannic, Philippe dated Dec. 6, 2011 with DDX_Buhannic 001, 003, 004a, 006, 009, 010, 011, 013, 014, 015; PDX_Buhannic 001—002.
Deposition testimony of Buist, Walter dated Jun. 11, 2009 with PDX 950-955, 957-958; PDX 365.
Deposition testimony of Feltes, David dated Jan. 24, 2007 with PDX_Feltes 002.
Deposition testimony of Greenstein, Mark dated Feb. 24, 2011 with DDX_Greenstein 003, 008.
Deposition testimony of Havard, Laurent dated Nov. 14, 2012; Errata dated Dec. 7, 2012.
Deposition testimony of McCausland, Robert dated Apr. 7, 2005 with DDX 111-114.
Deposition testimony of Peake, Junius dated Jun. 3, 2005 with DDX 121; Errata dated Jul. 26, 2005.
Deposition testimony of Spada, Bruno dated Dec. 19, 2012.
Deposition testimony of Steiner, Erik dated Mar. 8, 2011 with DDX_Steiner 001, 003-005; Errata dated May 5, 2011.
Deposition testimony of Stengard, Mats dated Oct. 25, 2011 with DDX_Stengard001-003; Errata dated Nov. 25, 2011.
Deposition testimony of Villain, Michael dated Oct. 11, 2011 with DDX_Villain001, 002, 006, 011, 012.
Deposition testimony of Wille, Mark dated Jun. 29, 2011 with DDX_Wille 002, 010, 011.
Deposition testimony of Yarovsky, Tina dated Apr. 13, 2007 with DDX 474.

(56) References Cited

OTHER PUBLICATIONS

Deutsche Borse Group, DTB Member Manual Trading, Description of the Screens, Eurex 1.0/DTB 5.0 Version 01 May 11, 1998, E0000144-0000305.
dsmChanges.txt, alleged available as of Feb. 3, 2006, PDX 958.
Edo User Guide Release 1.10.1, The Global Order Routing and Order Execution System, alleged available as of May 7, 1997, G0049458-0049531, DDX_Buhannic 015.
Email from J. Damgard to FIA Board of Directors re FIA Subcommittee on Intellectual Property, alleged available as of Nov. 3, 2004, FIA0008, PDX_Buhannic 002.
English Translation of Tokyo Stock Exchange, Orientation Materials for Participants, New Future Options Trading System, Produced on Feb. 5, 2007 by Defendant GL Consultants, Inc (GL) in civil proceeding 1:05-cv-04120 *Trading Technologies International, Inc.* v. *Gl et al*, alleged available as of Sep. 1997, G0100319-0100355.
English Translation of Tokyo Stock Exchange, Orientation Materials for Participants, New Future Options Trading System, Produced on Oct. 29, 2010 by Defendant Rosenthal Collins Group, LLC (RCG) in civil proceeding 1:10-cv-00929 *Trading Technologies International, Inc.* v. *RCG*, alleged available as of Sep. 1997, RCG-110146811-0146830.
eSpeed's Answers to TT's Eighth Set of Interrogatories, Interrogatory No. 22, Case No. 04 C 5312, dated Aug. 4, 2006.
Euro Servisen customers screen layout, hand drawn, alleged available as of Apr. 20, 2011, DDX_Gemon 001.
European Search Report for EP Application No. 04105905.6 dated Mar. 24, 2005, mailed Apr. 1, 2005.
Front Capital Systems AB, OPTRADE User Manual, Version 1.70, alleged available as of Jan. 1, 1991, G0175926-G0175955.
GATElab, webpage of product offerings, alleged available as of Jan. 1, 2011, DDX_Villain 012.
Geotext English Translation of Tokyo Stock Exchange, Futures/Options Trading System, Guidelines for Operating the Trading Terminals, alleged available as of Aug. 1, 1998, RCG-TT 0146831-RCG-TT 0146846.
GL and SunGard's Supplemental Objections and Responses to TT's Interrogatories, Case No. 05-cv-4120, dated Mar. 8, 2013, Redacted, Non-confidential portions only.
GL Trade User Guide for Globex2, alleged available as of Apr. 1, 1999, CME-E0014287-0014489.
GL Trade, GL Win Version 4.50 Note d'information, alleged available as of Mar. 3, 1999, G0108715-0108751, DDX_Villain 006.
GL Trade, GLNEGO Version 4, alleged available as of Feb. 1, 1999, 60123387-0123447.
GL Trade, Matif VF: V4.50, alleged available as of Mar. 30, 1999, G0123140-G0123209.
GL Trade, Note d'information d'utilisation de GLWIN pour le passage des futurs CAC et STOXX sur NSC VF (French-language document); Informational notice of use on GLWIN (with Trade Pad) re Stockwatch and GLNego equivalents, alleged available as of Mar. 9, 1999, G0111620-G0111634.
GL Trade, User Guide V4.50, LIFFE Connect for Futures by GL Trade, alleged available as of Mar. 1999, G-RP0123448.
Great Britain Search Report on GB Application No. 02193068.8 dated Nov. 27, 2002.
Handwritten diagram re INTEX screen, alleged available as of Apr. 7, 2005, DDX 112.
Handwritten document entitled pre '92 and post '92 with figures, alleged available as of Mar. 8, 2011, DDX_Steiner 003.
Handwritten document with drawing and figures, alleged available as of Mar. 8, 2011, DDX_Steiner 001.
Handwritten document with x's and lines, alleged available as of Feb. 24, 2011, DDX_Greenstein 003.
Handwritten document with XYZ and numbers, alleged available as of Mar. 8, 2011, DDX_Steiner 004.
International Preliminary Examination Report on PCT Application No. PCT/US01/06792 dated Apr. 9, 2002, mailed Apr. 12, 2002.
Intex Project Specifications, alleged available as of Jul. 22, 1985, eS0024917-0024950, DDX 114.
Intex, Functional Specifications, alleged available as of Aug. 1981, eS0003547-0003616, DDX 113.
Kollock, P. "Market Morphing" Futures Industry Magazine, vol. 7, No. 7, p. 15-17, alleged available as of Oct. 11, 1997, G0116279-0116361, DDX_Villain 002.
Letter from W. Buist to G. Fishman re tasks performed for TT project, alleged available as of Jun. 12, 2006, PDX 954.
LIFFE, The Application Program Interface (API) Reference Manual for Liffe Connect, Release 3.1, alleged available as of Sep. 1998, G0023004-0023068.
Marion, L. "The paperless exchange" Institutional Investor, vol. 20, No. 4, black and white, alleged available as of Apr. 1986, DDX_Steiner 005.
Marion, L. "The paperless exchange" Institutional Investor, vol. 20, No. 4, color, alleged available as of Apr. 1986, G0157750-0157755, DDX_Wille 002.
Memo to Distribution from R. McCausland re: Open Spread Development; Memo to E. Brian from McCausland re: the Full Intex Network & Trading System Components, M1—M17, alleged available as of May 29, 1984, DDX 111.
Memorandum Opinion and Order issued by Judge James B. Moran in Case 1:05-cv-04088, *Rosenthal Collins Group, LLC*, vs. *Trading Technologies International, Inc.*, May 16, 2007, PDX 950.
Midas-Kapiti International, Market Trader, Nikkei 225 & Nikkei 300 Index Options and Index Future Trading Users Guide, v1.3, alleged available as of Dec. 18, 1997, G0100463-0100481.
Midas-Kapiti International, Release Notes, Market Trader v.5.2e, alleged available as of May 24, 1999, G0105642-G0105667.
Munshi, Jamal Huq. "The Impact of Information Technology on Securities Markets: Evidence from the New York Stock Exchange," PhD dissertation, University of Arkansas. Ann Arbor: ProQuest/Umi, Order No. 9237410, alleged available as of Jan. 1, 1991, G0147878-G0148049.
New York Stock Exchange, Display Book User Reference, alleged available as of Jan. 1, 1992, G0146068-G0146243.
New York Stock Exchange, Floor Operations Display Book Guide, Version 3.1, alleged available as of May 1998, G0145920-G0146065, DDX_Wille 011.
New York Stock Exchange, Portions of 1984 and 1985 Annual Reports, alleged available as of 1984, G0146656-G0146659.
New York Stock Exchange, Release 2.1 Display Book, alleged available as of Nov. 1, 1996, G0146649-0146650. DDX_Wille 010.
OM Click Trade User's Guide for Windows NT, including Addendum for HKFE, alleged available as of Oct. 1998, G0046709-0046816, DDX_Stengard 003.
OM, The OM Click Trade User Guide for Windows NT, alleged available as of Nov. 1997, G0202935-0203019, DDX_Stengard 002.
Open E Cry, LLC's Initial Invalidity Contentions, Case No. 1:10-cv-00885, dated Oct. 19, 2010 (uploaded in three portions).
Osaka Securities Exchange (Japanese-language document), alleged available as of Jan. 1, 1997, G0046918-0046937.
P.O.S. Display Book, Release 2.0: Screen Components Navigation & Layout, User Requirements Specification, alleged available as of Mar. 28, 1995, 60153405-0153428, DDX_Greenstein 008.
Philpot, J., and Peterson, C. "Improving the Investments or Capital Markets Course with Stock Market Specialist," Financial Practice and Education, Fall/Winter 1998, alleged available as of 1998, G0075378-0075384.
Piantoni, R., and Stancescu, C. "Implementing the Swiss Exchange Trading System," Proceedings of the 27th International Symposium on Fault-Tolerant Computing (FTCS), alleged available as of 1997, G0077767-G0077771.
PrimeTrade's application window, alleged available as of Jun. 22, 1998, DDX_Buhannic 004a.
PrimeTrade's application window, alleged available as of Jun. 22, 1998, 60080109-0080110, DDX_Buhannic 003.
Provisional U.S. Appl. No. 60/678,106, filed May 4, 2005, by Rosenthal et al., RCG-TT-146847.
Provisional U.S. Appl. No. 60/736,353, filed Nov. 13, 2005, by Mackey et al., RCG-TT0146879.
RCG Expert Declaration of W. Buist in Case 1:05-cv-04088, *Rosenthal Collins Group, LLC*, vs. *Trading Technologies International, Inc.*, Apr. 26, 2006, PDX 365.

(56) References Cited

OTHER PUBLICATIONS

RCG Expert Declaration of Walter D. Buist in Case 1:05-cv-04088, *Rosenthal Collins Group, LLC*, vs. *Trading Technologies International, Inc.*, Sep. 29, 2006, PDX 952.
Release Form for Sachs Communications Group, alleged available as of Sep. 15, 1998, DDX 204.
Release Form for Sachs Communications Group, alleged available as of Sep. 16, 1998, DDX 206.
Rosenthal Collins Group LLC, Initial Contentions for Non-Infringement and Patent Invalidity, Civil Action No. 10-cv-929, dated Oct. 29, 2010.
Sachs Communication Group Release Form, alleged available as of Sep. 14, 1998, SACHS000055, DDX 202.
Sachs Communications Group Invoice to Mauro Designs, alleged available as of Oct. 20, 1998, SACHS000050-000051, DDX 197.
Sachs Communications Groups Client Sign-In Checklist, alleged available as of Sep. 14, 1998, SACHS000054, DDX 201.
Sachs Communications Groups Client Sign-In Form, alleged available as of Sep. 14, 1998, SACHS000053, DDX 200.
Sachs Communications Groups Client Sign-In Form, alleged available as of Sep. 15, 1998, SACHS000015, DDX 203.
Sachs Communications Groups Client Sign-In Form, alleged available as of Sep. 16, 1998, SACHS000027, DDX 205.
Schroeder, M. "After-Hours Trading is Coming" Investor Relations Business, Mar. 15, 1999, DDX 550.
Schroeder, M. "Eclipse's After-Hours Trading Service Due to Debut This Summer" Web Finance, Mar. 15, 1999, DDX 550.
Schroeder, M. "Knight to Offer After-Hours Trading" Web Finance, Mar. 29, 1999, DDX 550.
Schwartz, R., and Weber, B. "Next-Generation Securities Market Systems: An Experimental Investigation of Quote-Driven and Order-Driven Trading" Journal of Management Information Systems, vol. 14, No. 2, p. 57-59, alleged available as of Fall 1997. CME-E0000786-0000808.
Screenshot of C:\ drive, alleged available as of Apr. 18, 2006, PDX 951.
Screenshot of filepath L:\java\com\witcapital\dsm\client, alleged available as of Nov. 3, 1998, PDX 953.
SPATS (Security Pacific Automated Trader System), The Electronic Broker, User Manual, alleged available as of Jun. 26, 1986, WF005924-WF005964.
SQUARE, Final Fantasy II Instruction Booklet, alleged available as of Jan. 1, 1991, RCG-TT0146485-0146525.
Supplemental Invalidity and Unenforceability Contentions of GL, Civil Action No. 05-cv-4120, dated Mar. 8, 2013.
Swiss Exchange SWX, TS User Manual, Version 2.1, alleged available as of Dec. 31, 1998, G0107838-G0108086.
SWX, Annual Report, 1998, G0048218-0048270.
SWX, Bourse suisse Manuel d'utilisateur TS, v2.0 (French-language document), alleged available as of Aug. 31, 1996, G0079810-0080070, DDX_Buhannic 006.
SWX, Swiss Exchange SWX Presentation, IT Overview, alleged available as of Nov. 2, 1999, G0087803-0087818, DDX_Buhannic 0014.
SWX, The Swiss Exchange: From vision to reality, alleged available as of Dec. 1996, G0048801-0048838.
SWX, The SWX Platform and Associated Systems, alleged available as of May 1, 2006, G0029564-0029633, DDX_Buhannic 009.
TradeStation's Initial Invalidity Contentions, Civil Action No. 10-cv-884, dated Oct. 12, 2010.
*Trading Technologies International, Inc.*, v. *Ninja Trader, LLC*, Complaint for Patent Infringement and Jury Demand, Jul. 7, 2005, DDX 360.
TradingScreen, FuturesHUB Brochure, alleged available as of Nov. 1, 2007, DDX_Buhannic 013.
TSE Manual (Japanese-language document), System for Buying and Selling Futures and Options Transaction Terminal Operational Guidelines, alleged available as of Aug. 1, 1998, T5E0000000647-T5E0000000995.

Weber, B., "Assessing Alternative Market Structures Using Simulation Modeling," in Global Equity Markets: Technological, Competitive, and Regulatory Challenges, ed. Robert A. Schwartz (New York: New York University, 1995) p. 157-184, alleged available as of 1995, DONEFER003919-003935.
Weber, B., "Elements of Market Structure for On-Line Commerce" in Future Markets: How Information Technology Shapes Competition, C. Kemerer (ed.), Kluwer Academic Publishers, p. 15-32, alleged available as of 1998, CME-E0000809-CME-E0000826.
Weber, Bruce William. "Information Technology and Securities Markets: Feasibility and Desirability of Alternative Electronic Trading Systems," PhD dissertation, University of Pennsylvania. Ann Arbor: ProQuest/UMI, Order No. 9125774, alleged available as of 1991, G0171612-0171925.
Website of EccoWare, Professional Software for Professional Traders, [Retrieved from the Internet at http://www.eccoware.com/products.php on Jan. 23, 2007], alleged available as of Jan. 23, 2007, PDX_Feltes 002.
WIT Capital check, alleged available as of Oct. 19, 1998, DDX 199.
WIT Capital invoice, alleged available as of Sep. 30, 1998, DDX 198.
Annexes A and B of TT Reply Brief, received by European Patent Office on Oct. 3, 2006.
'Building for Excellence', Minex Brochure, DTX 1153, Silverman000330-Silverman000334, alleged available as of May 1, 1992.
Chicago Mercantile Exchange (CME) Brochure, DTX1163, Silverman000406-Silverman000407, alleged available as of Feb. 1, 1997.
Court's ruling on no prior sale dated Aug. 27, 2007.
English Translation of TSE "Publication 1," Sep. 1997.
English Translation of TSE "Publication 2," Aug. 1998.
English Translation of TSE "Publication 3," Jul. 31, 2000.
English Translation of TSE Document 1, Jan. 2000.
Fig.2 Substitute Sheet (Rule 26), Opposition EP 1 319 211 B1 Exhibit 13A, Mar. 2, 2000.
Futures/Options Trading System Guidelines for Operating the Trading Terminals, TSE Business Systems Dept., TSE00628-643, eS062278-eS062293, D1 (3), alleged available as of Aug. 1, 1998.
GL Brochure, G0021652-21658, alleged available as of Jan. 1, 1998.
GL Product Leaflet Re: Mosaic, G0022529-22530, alleged available as of Jan. 1, 2001.
GL Trading Pad Manual, G0020819-G0020826, alleged available as of Aug. 12, 1999.
GL WIN and Related Software Manual, 2) G0025942-26267, alleged available as of Feb. 4, 1999.
GL WIN and Related Software Manual, 3) G010239-10610, alleged available as of Sep. 11, 2000.
GL WIN et Logiciels complementaires (French), G0009495-9874, alleged available as of Sep. 11, 2000.
GL WIN Version 4.51, G0118856-G0118865, alleged available as of Jun. 2, 1999.
Internal Product News doc on QuickTrade, G0020468-20471, alleged available as of Jan. 1, 2001.
'Introducing the Company: GL Trade' product offerings and slide presentation (to Reuters), G0026534-26559, alleged available as of Jul. 26, 1999.
IRIS Investment Support Systems Window Ad, Opposition EP 1 319211 B1 Exhibit 10, Jun. 1, 1999.
LIFFE Connect for Futures leaflet, G0023885-23888, alleged available as of Jan. 20, 1999.
LIFFE guide/pamphlet, DX 148, DTX 148, alleged available as of Jan. 1, 1994.
LIFFE's New Electronic Trading Platform for Futures, LIFFE 202-261, Opposition EP 1319211 B1 Exhibit 8D, Sep. 24, 1998.
Memorandum Opinion and Order Re: Court Reaffirming Priority dated Jan. 3, 2008.
Memorandum Opinion and Order Re: Inequitable Conduct dated May 6, 2008.
Memorandum Opinion and Order Re: No prior use dated Aug. 16, 2007.
Overview re Digital trading facility, DX 443, CM 006315-CM 006344, DTX 443, alleged available as of Jan. 1, 1999.
Overview re SPATS; the Electronic Broker, DX 446, DTX 446, alleged available as of Jun. 26, 1986.

(56) References Cited

OTHER PUBLICATIONS

Photo of trader w/ APT screen, DX 151, LIFFE 00167—LIFFE 00168, DTX 151, alleged available as of Mar. 1, 1994.
Photocopy of Disks containing exhibits A (disk alleged available as of Nov. 3, 1998) and B (disk alleged available as of Mar. 16, 1999) to declaration of W. Buist, PTX366, Jun. 23, 2006.
U.S. Appl. No. 60/186,322, Certified Copy dated May 18, 2011, Opposition EP 1 319211 B1 Exhibit 13B.
PTS Client Version 2.1 F, DX 119, PATS 00067-PATS 00082, DTX 119, alleged available as of Mar. 1, 1998.
QuickTrade Document and Brochure, G021027-21031, alleged available as of Aug. 23, 2001.
REFCO English Translation of Tokyo Stock Exchange, Publication 1, 'Next-Generation Futures Options Trading System' (participants seminar materials), Sep. 1997.
REFCO English Translation of Tokyo Stock Exchange, Publication 2, 'Futures/Options Trading System Guidelines for Operating the Trading Terminals' (participants seminar materials), Aug. 1998.
REFCO English Translation Tokyo Stock Exchange, Publication 3, 'Tokyo Stock Exchange 50th Anniversary Book of Materials', Jul. 31, 2000.
Sample screens of APT system, DX 150, DTX 150, alleged available as of Jan. 1, 1993.
Screen No. 100-Order Book & Order Entry 1 (Single View), eS060637-eS060639, alleged available as of Apr. 1996.
Screenshot of GL TradePad, G0119660, alleged available as of Jan. 26, 1999.
System for Buying and Selling Futures and Options Transaction Terminal Operational Guidelines, TSE Business Systems Dept., TSE00647-81 0, eS0622977-eS062366, D1 (2), alleged available as of Aug. 1, 1998.
System for Buying and Selling Futures and Options Transaction Terminal Operational Guidelines, TSE Business Systems Dept., TSE647-995, eS062297-eS062380, alleged available as of Aug. 1, 1998.
THOMSON FINANCIAL leaflet, G0022445-22450, Sep. 2003.
TIFFE Internet Article, 'New On-Screen Trading Terminals', E2, Retrieved from the Internet on Oct. 1, 2006.
TradePad Instructions (French), G0025748-G0025749, alleged available as of Jan. 11, 1999.
Trading Pad Document (E3), Jul. 27, 2005.
TSE Japanese Document, pp. 4-15, alleged available as of Aug. 1, 1997.
TSE Japanese Document, pp. 6-15, alleged available as of Aug. 1, 1998.
WIT Capital digital trading facility presentation to Goldman Sachs, DX 438, CM 004523-CM 004547, DTX 438, alleged available as of Jan. 1, 1999.
WIT Capital Digital trading facility presentation to PaineWebber, Inc., DX 439, DTX 439, alleged available as of Nov. 11, 1998.
WIT Digital Stock Market, User Interface Rev. 9, Exhibit 15, copied on Oct. 16, 2006.

| Bid Qty 202 | Ask Qty 204 | Price 206 |
|---|---|---|
| | | 99 |
| | | 98 |
| | | 97 |
| | | 96 |
| | | 95 |
| | 400 | 94 |
| | 120 | 93 |
| | 180 | 92 |
| | 120 | 91 |
| 150 | | 90 |
| 100 | | 89 |
| 150 | | 88 |
| 25 | | 87 |
| | | 86 |

FIG. 2

SYSTEM AND METHOD FOR AUTOMATIC SCALPING A TRADEABLE OBJECT IN AN ELECTRONIC TRADING ENVIRONMENT

CROSS REFERENCE TO RELATED APPLICATIONS

This application is a continuation of U.S. patent application Ser. No. 10/403,879 filed Mar. 31, 2003 and issued Nov. 4, 2008 as U.S. Pat. No. 7,447,655, which is a continuation-in-part of U.S. patent application Ser. No. 10/125,894, filed on Apr. 19, 2002 and issued Jun. 17, 2008 as U.S. Pat. No. 7,389,268, which is a continuation-in-part of U.S. patent application Ser. No. 09/971,087, filed Oct. 5, 2001 and issued Oct. 24, 2006 as U.S. Pat. No. 7,127,424, which claims the benefit of U.S. Provisional Application No. 60/238,001, filed Oct. 6, 2000. The U.S. patent application Ser. No. 10/125,894 is also a continuation-in-part of (i) U.S. patent application Ser. No. 09/590,692, filed Jun. 9, 2000 and issued Aug. 3, 2004 as U.S. Pat. No. 6,772,132, and (ii) U.S. patent application Ser. No. 09/589,751, filed Jun. 9, 2000 and issued Aug. 30, 2005 as U.S. Pat. No. 6,938,011. The application Ser. Nos. 09/590,692 and 09/589,751 both claim the benefit of U.S. Provisional Application No. 60/186,322, filed Mar. 2, 2000. The U.S. patent application Ser. No. 10/125,894 also claims the benefit of U.S. patent application Ser. No. 60/325,553, filed Oct. 1, 2001. The entire content of each of the above-referenced applications is incorporated herein by reference.

FIELD OF INVENTION

The present invention is directed towards electronic trading. More specifically, the present invention is directed to tools for automatic trading tradeable objects that can be traded with quantities and/or prices.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions, and without the need to make personal contact with a broker.

Electronic trading is generally based on a host exchange, one or more computer networks, and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

Using client devices, market participants or traders link to the host exchange through one or more networks. A network is a group of two or more computers or devices linked together. There are many types of wired and wireless networks such as local area networks and wide area networks. Networks can also be characterized by topology, protocol, and architecture. For example, some market participants may link to the host through a direct connection such as a T1 or ISDN. Some participants may link to the host exchange through direct connections and through other common network components such as high-speed servers, routers, and gateways. The Internet, a well-known collection of networks and gateways, can be used to establish a connection between the client device and the host exchange. There are many different types of networks and combinations of network types known in the art that can link traders to the host exchange.

Regardless of the way in which a connection is established, software running on the client devices allows market participants to log onto one or more exchanges and participate in at least one market. A client device is a computer such as a personal computer, laptop computer, hand-held computer, and so forth that has network access. In general, client devices run software that creates specialized interactive trading screens. Trading screens enable market participants to obtain market quotes, monitor positions, and submit orders to the host.

Generally, when an order is submitted to a host exchange, the host checks the limits of the order, for example price and quantity, and prioritizes the order with other orders of the same price. When buy and sell order prices cross in the market, a trade occurs, and the information related to the trade is then relayed in some fashion to the client devices. In fact, the host exchange publishes a data feed to the client devices so that the traders can have access to the most current market information.

Market information commonly includes information regarding the inside market and market depth. The inside market is the lowest sell price in the market and the highest buy price in the market at a particular point in time. Market depth refers to quantity available at the inside market and can refer to quantity available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for an infinite number of price levels, while some provide only quantities associated with the inside market, and others may provide no market depth at all. Additionally, host exchanges can offer other types of market information such as the last traded price (LTP), the last traded quantity (LTQ), and/or order fill information.

To profit in electronic markets, market participants must be able to assimilate large amounts of data provided by an exchange, and to react more quickly than other competing market participants. Some traders, commonly known as scalpers, trade for small, short-term profits during the course of the trading session. Such traders establish and liquidate their positions quickly, usually within the same hour, or a few minutes, thus making small profits or incurring small losses. However, because market information provided to a trader in an electronic trading environment may change so much faster than in the traditional pit environment, the trader may not be able to respond to the changing market as fast as he/she would wish to. It is therefore desirable to offer tools that can assist a trader in trading a tradable object in an electronic marketplace and help the participant to make desirable trades.

BRIEF DESCRIPTION OF THE DRAWINGS

Example embodiments of the present invention are described herein with reference to the following drawings, in which:

FIG. 2 is a block diagram illustrating a trading interface that allows a trader to enter orders on an electronic exchange;

DETAILED DESCRIPTION OF THE PREFERRED EMBODIMENT(S)

I. Automatic Trading Overview

As described with reference to the accompanying Figures, the present invention provides a method and system that preferably operates as an automatic scalping tool by automatically entering an order to offset a position created with another order that has been filled. That is, it preferably operates as a trader's automatic scalping tool that prevents a trader from holding his position open for a long period of time, and allows a trader to make profit upon detecting small market movements.

According to one embodiment, a trader may configure a target price based on which the automatic scalping tool may enter orders to an exchange. For example, if the automatic scalping tool detects the market trend in an upward direction and further that the inside market reaches or crosses the user pre-configured target price, the automatic trading tool may automatically place a sell order to open a position for the trader. In such an embodiment, a price at which the automatic scalping tool places the sell order may be determined based on any user defined formula. For example, the sell order may be placed at the inside market price level or a specific number of ticks away from the inside market. When the sell order is filled, and upon detecting that the market moves in a downward direction and that the inside market reaches or crosses the target price, the automatic scalping tool may automatically place a buy order to offset or close the position created with the sell order. Advantages, including those described directly above, will become readily apparent to one skilled in the art upon reading the description herein.

II. Hardware and Software Overview

Figure 1:
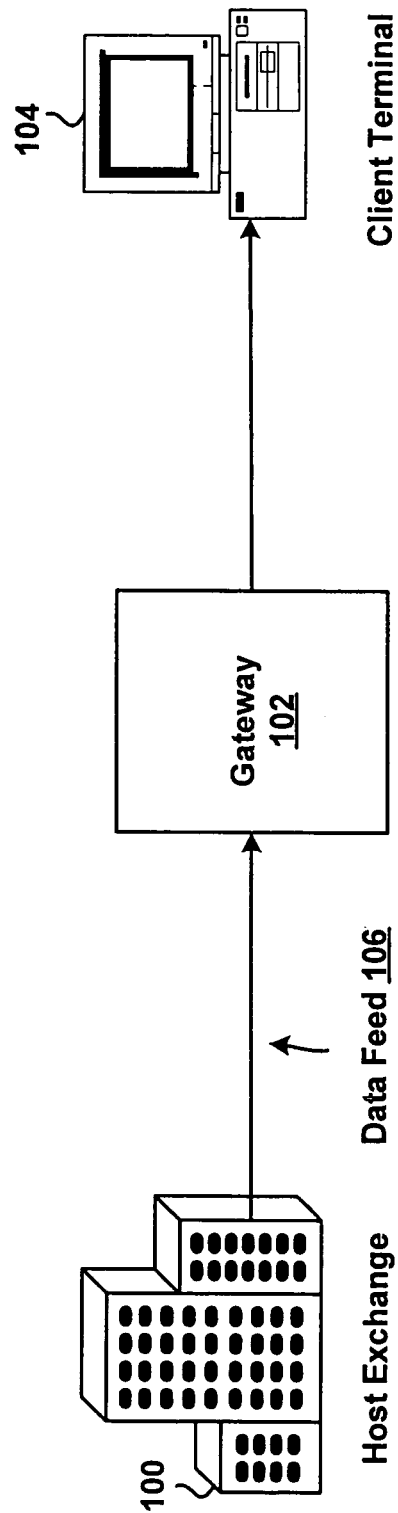
FIG. 1 is an example of a network configuration for a communication system utilized to access one or more exchanges.

FIG. 1 is a block diagram that illustrates an electronic trading system 100 in accordance with the preferred embodiment. The system 100 includes at least one host exchange 102 and one or more client devices 104. Intermediate devices such as gateways, routers, and other such types of network devices may be used to assist the client device 104 and host exchange 102 in communicating over network(s) 106. Intermediate devices, additional host exchanges, and additional client devices are not shown in FIG. 1 for sake of clarity. It should be understood, however, that other types of network configurations known in the art may be used as the system 100.

A. Host Exchange

The host exchange 102 may include the Chicago Board of Trade ("CBOT"), the New York Stock Exchange ("NYSE"), the Chicago Mercantile Exchange ("CME"), the Xetra (a German stock exchange), or the European derivatives market ("Eurex"). The host exchange 102 might also refer to other systems, from basic to more complex systems, which automatically match incoming orders. These example host exchanges and other host exchanges are well known in the art. Communication protocols required for connectivity to one of these host exchanges are also well known in the art.

An exchange 102, 104, 106 can implement numerous types of order execution algorithms, sometimes the type of algorithm depends on the tradeable object being traded. The preferred embodiments may be adapted by one skilled in the art to work with any particular order execution algorithm. Some example order execution algorithms include first-in-first-out and pro rata algorithms. The first-in-first-out (FIFO) algorithm, used for some markets listed with Eurex for example, gives priority to the first person to place an order. The pro rata algorithm, used for some markets listed with LIFFE for example, splits all orders for the same price. The present invention is not limited to any particular type of order execution algorithm.

Regardless of the type of order execution algorithm used, each host exchange including the host exchange 102 preferably provides similar types of information to the subscribing client devices 104. The information that the host exchange 102 provides is referred to hereinafter as market information. Market information may include data that represents just the inside market, where the inside market is the lowest sell price (best offer or best ask) and the highest buy price (best bid) at a particular point in time. The market information 108 may also include market depth. Market depth refers to quantities available at the inside market and can also refer to quantities available at other prices away from the inside market. The market depth of a tradeable object is preferably represented in an exchange order book which provides at least some of the current bid and ask prices and associated quantities in the market for that tradeable object. This information, or some portion of it, is preferably transmitted to client devices in the form of market updates in a data feed. Market information can contain other types of market information such as the last traded price (LTP), the last traded quantity (LTQ), and/or order fill information. The contents of market information are generally up to the host exchange 102.

As previously described, the preferred embodiment may be used to trade any tradeable object. As used herein, the term "tradeable object," refers simply to anything that can be traded with a quantity and/or price. It includes, but is not limited to, all types of tradeable objects such as financial products, which can include, for example, stocks, options, bonds, futures, currency, and warrants, as well as funds, derivatives and collections of the foregoing, and all types of commodities, such as grains, energy, and metals. The tradeable object may be "real", such as products that are listed by an exchange for trading, or "synthetic", such as a combination of real products that is created by the user. A tradeable object could actually be a combination of other tradeable object, such as a class of tradeable objects.

B. Client Device

In the preferred embodiment, the client device 104 is a computer that provides an interface to trade at the host exchange 102. An example client device is a personal computer, laptop computer, hand-held computer, and so forth. The client device 104, according to the preferred embodiment, includes at least a processor and memory. The processor and memory, which are both well-known computer components, are not shown in the figure for sake of clarity. Memory may include computer readable medium. The term computer readable medium, as used herein, refers to any medium that participates in providing instructions to the processor for execution. Such a medium may take many forms, including but not limited to, non-volatile media, volatile media, and transmission media. Non-volatile media includes, for example, optical or magnetic disks, such as a storage device. Volatile media may include dynamic memory, such as main memory or RAM (random access memory). Common forms of computer-readable media include, for example, a floppy disk, a flexible disk, a hard disk, a magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

In the preferred embodiment, the client device 104 receives market information 108 from the host exchange 102. The market information is received over the network(s) 106. The network(s) 106 may include a group of computers and/or associated devices that are connected by communications facilities, and can involve permanent connections, such as cables, or temporary connections made through telephone or other communication links. The network(s) 106 can be as small as a LAN (local area network) consisting of a few computers, printers, and other devices, or it can consist of many small and large computers distributed over a vast geographic area (WAN or wide area network), or it can consist of both types of networks (both LAN and WAN).

According to the preferred embodiment, market information is displayed to the trader on the client device 104. Preferably, the market information, or a portion thereof, is arranged using techniques described herein and is displayed on the visual output device or display device of the client device 104. The output device can be any type of display. For example, the display could be a CRT-based video display, an LCD-based or a gas plasma-based flat-panel display, or some other type of display. The present invention is not limited to any type of display.

Upon viewing market information or a portion thereof, a trader may wish to send transaction information to the host exchange 102. To do so, the trader may input the transaction information into the client device by typing into a keyboard, through a mouse, or some other input device. Preferably, transaction information includes an order to buy or an order to sell a tradeable object. An order can have multiple parameters, price, quantity, a type of order (e.g., a buy or sell), but the present invention is not limited to a particular number of parameters that may be used to characterize the order. According to another embodiment, transaction information might also refer to other order related transactions such as delete order messages, cancel and replace messages, and so forth. There are many different types of messages and order types that can be submitted to the host exchange 102, all of which are considered various types of transaction information. Then, transaction information is sent from the client device 104 to the host exchange 102 over the network(s) 106.

As previously described, FIG. 1 provides an example system overview according to a preferred embodiment. Various changes and/or modifications may be made to the system and still fall within the scope of the present invention. For example, it should be understood that the present invention is not limited to any particular network architecture or configuration such as described in FIG. 1. The present invention may be applied with utility on any electronic device in any network that can be used for electronic trading.

C. Trading Interface

A commercially available trading application that allows a user to trade in a system like the one shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. However, the preferred embodiments are not limited to any particular product that performs translation, storage and display functions.

The example embodiments for automatic scalping will be described below in reference to the MD Trader™-style display that displays information, such as orders to buy or orders to sell, in association with price levels arranged along a common static axis or scale of prices. The quantities associated with the orders to buy are preferably displayed in a bid display region, and quantities associated with orders to sell are preferably displayed in an ask display region. According to one embodiment, bid and ask display regions preferably have a plurality of locations, where each location corresponds to a price level along the common static axis of prices.

The quantities for each order being displayed via the MD Trader™-style display may be displayed using any indicator types. For example, the indicator can be a graphical representation of quantity (e.g., colors, bars, etc.) or can simply be a number. The price levels are fixed in relation to bid and ask display regions such that the indicators displayed in these regions can move relative to the display (e.g., the screen). For example, the portion of the static axis that is being viewed can be changed by scrolling up or down the axis or by entering a repositioning command. One embodiment using this type of display system displays market information with respect to a vertical axis so that the market information fluctuates logically up and down relative to the axis as the market prices fluctuate. It should be understood that while the example embodiments are described in reference to the MD Trader™-style display, the present invention is not limited to any particular display and could be used with different or equivalent displays. Further, it should be understood that many modifications to the MD Trader™-style display are possible as well. For example, information related to a tradable object may be displayed horizontally relative to a horizontally oriented axis, n-dimensionally, or in any other fashion.

In a fast moving market, where varying price levels are trading (i.e., bids and offers entering the market are being matched at different prices), it is beneficial for a trader to be able to quickly enter orders and analyze market information. FIG. 2 illustrates a display 200 that allows a trader to quickly enter orders at specific price levels by clicking next to a static axis of prices, displayed as a static column, and to quickly and easily see information such as working orders. The display 200 may be used to display traded quantity by price as will be described in greater detail below.

The display may generally include a number of different regions that may be used to display market information. As shown in FIG. 2, the display 200 includes a price column 206, a bid quantity ("Bid Qty") column 202, and an ask quantity ("Ask Qty") column 204. In the preferred embodiment, the three columns are shown in different colors so that a trader can distinguish them. Further, it should be understood that a trader has the ability to control the arrangement of the columns on the display. For example, the Bid Qty column 202 and the Ask Qty column 204 could be positioned to the left of the price column 200. However, it should be understood that other arrangements are possible as well. The Bid Qty column 202 displays bid quantities, and the Ask Qty column 204 displays ask quantities. The representative prices for given tradable object are shown in the price column 206.

As mentioned in the preceding paragraphs, the price column 206 includes a static axis of prices. It should be understood that static, in the context of the embodiments described hereinafter, does not mean immovable, but rather fixed in relation. For example, with a static axis of prices, the axis itself may be movable (e.g., via a recentering, repositioning, or scrolling command), but the prices represented remain fixed in relation to the market information, subject to consolidation or expansion. Further, for example, the static axis of prices may stay fixed even when the market moves or when the market changes unless a repositioning, recentering or scrolling command is received. In the preferred embodiment, the static axis of prices is associated with a plurality of locations, and each location corresponds to a different price. According to one example, the price axis does not move in response to price changes, such as price addition or deletion in the exchange order book. Thus, when an exchange order book is updated to include quantity at a new price or to remove a price, the price axis preferably does not move, and the order data is mapped to the predetermined location along the price axis corresponding to the new price. Further, as an example, the price axis preferably does not move (unless, for example, a repositioning, recentering or scrolling command is received) in response to a change in the inside market. It should also be understood that when the static price axis is described as not moving herein, the present application is referring to movements of the price axis within the trading interface display and not to movements caused by moving the location of the trading interface display on a screen. For example, the trading interface display can be a window on a computer display and dragging that window to a new location on the computer display would not be considered moving the price axis. It should be understood that in one embodiment, the static axis of prices could be displayed in any manner, including in a row, on any angle, or n-dimensionally, without departing from the invention. Further, alternatively, prices do not need to be displayed.

It should be understood that the display 200 is not limited to the columns and information described in reference to FIG. 2, and various other information may be presented in relation to the display 200. More information relating to the X_TRADER® and the MD Trader™-style display are described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. patent application Ser. No. 10/260,643, entitled "System and Method For Displaying Highest And Lowest Traded Prices Of Tradable Object," filed on Sep. 30, 2002, the contents of which are incorporated herein by reference. Moreover, the trading application may implement tools for trading tradable objects that are described in U.S. patent application Ser. No. 10/125,894, filed on Apr. 19, 2002, entitled "Trading Tools for Electronic Trading," the contents of which are incorporated herein by reference. The specific features of the embodiments of a display as in FIG. 2 are an example of one embodiment of a screen that can be used with the present invention. It should be understood that the present invention is not limited, however, to such a screen display, and could be used with any type of screen display.

III. Automatic Scalping

In accordance with one embodiment, the trading application may include an automatic scalping application that provides a way to automatically enter orders for a trader, or to automatically enter offsetting orders once a fill of another manually or automatically entered order is detected. It should be understood that the automatic scalping application may be located on a client terminal or any other network entity, such as a gateway, in communication with the client terminal. Using the methods described below, the automatic scalping application may assist scalpers to enter their orders faster and allows them to make higher profits or incur lower losses based on market movements. As explained earlier, scalping is a term that is well known in trading, and it refers to a trading technique in which a trader trades for relatively smaller gains over a short period of time.

In the embodiments described hereinafter, the automatic scalping application facilitates scalping by providing the user with an automatic order entry mechanism. The automatic order entry mechanism may be activated based on a user input that in turn may activate a dialog box via which a trader may enter scalping parameters. Additionally, the user input may activate one or more graphical indicators associated with one or more prices at which a tradeable object can be automatically traded. In such an embodiment, the graphical indicator(s) may be displayed via the trading interface in relation to the static axis of prices, and a trader may manipulate the indicators using a mouse, for example. However, other actuating mechanisms can be used as well to activate automatic scalping, such as, for example, a scalping icon displayed on the user interface that may be activated and deactivated by a trader during a trading day.

It should be understood that many different embodiments may be used to assist a trader in setting up automatic scalping parameters as well as indicators associated with prices at which an order may be automatically placed on the market by the automatic scalping application. In one embodiment, a trader may use a mouse input to position a horizontal line or any other type of graphical indicator associated with a target price, based on which the automatic scalping application may automatically enter orders to a host exchange. More specifically, the automatic scalping application will automatically enter orders depending on an inside market position relative to the target price. Alternatively, the automatic trading application may only enter orders automatically upon detecting that one of the manually entered orders has been filled.

Figure 3:
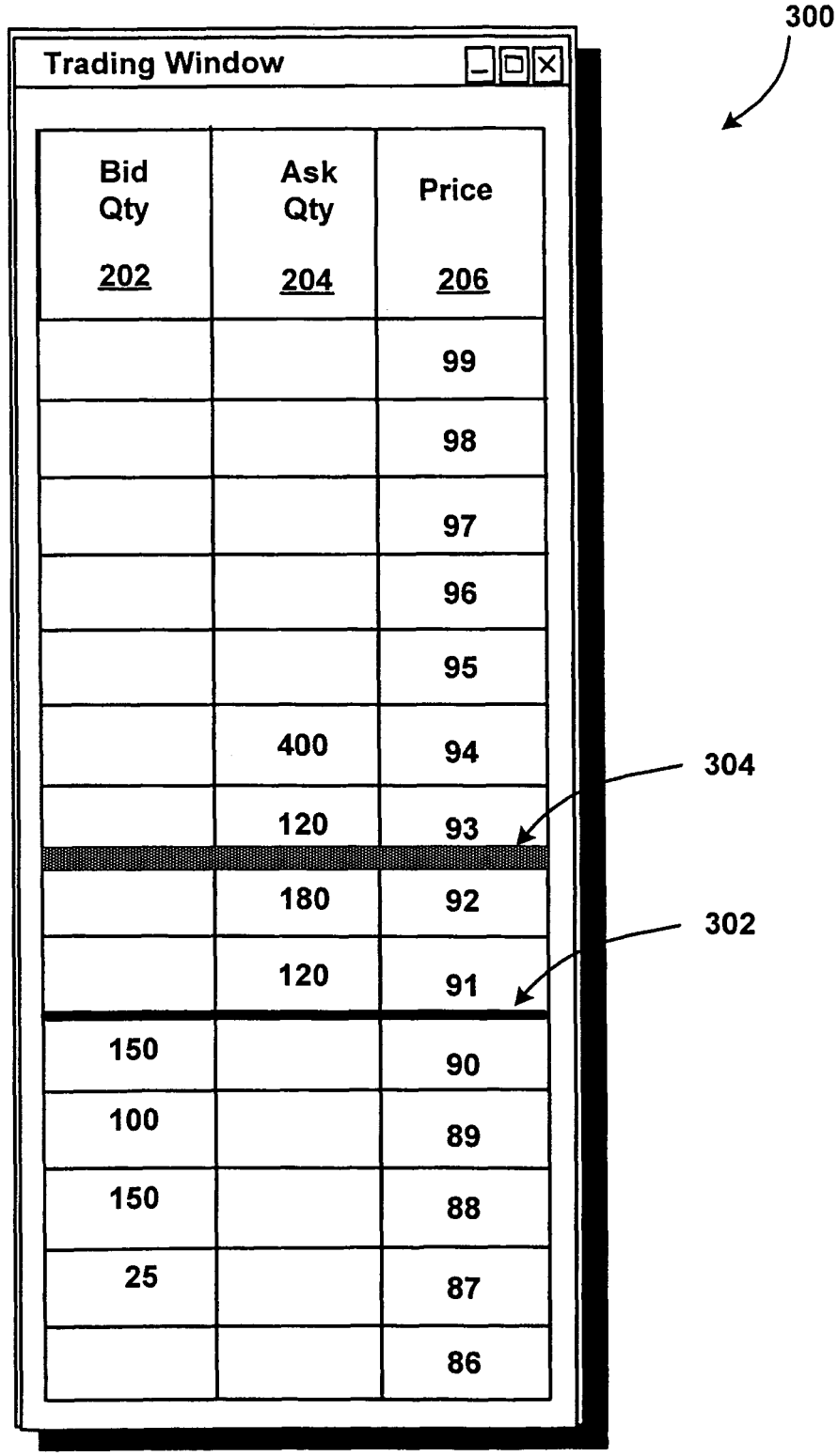
FIG. 3 is a block diagram illustrating a trading interface with a graphical indicator associated with a price level based on which one or more orders may be automatically sent to an electronic exchange.

FIG. 3 illustrates a trading interface 300 displaying a graphical indicator associated with a price level based on which one or more orders may be automatically submitted to an electronic exchange. The trading interface 300 displays an inside market indicator 302, and a graphical indicator 304 associated with a price level based on which the automatic scalping application may enter orders to an exchange. It should be understood that the graphical indicator 304 can have any format, and the format of the indicator 304 can be user configurable. For example, the indicator 304 is not limited to extending through the bid, ask, and price columns, and instead, could be displayed in the price column 206, or in relation to any other column. In one embodiment, when a trader enables the auto scalper feature, the graphical indicator 304 may be automatically displayed via the trading interface 300 at the mid-point of prices displayed via the trading interface, or in any other location on the trading interface. Once the indicator 304 is displayed via the trading interface 300, the trader may simply drag and drop the indicator 304 at a desired location or scroll the wheel of the trader's mouse up or down until the indicator is positioned at a desired price level. Using such a method, when a trader scrolls the wheel down and up, the indicator 304 may respectively move down and up on the trading interface. Once the trader positions the indicator 304 at the desired price level, the automatic scalping application may automatically enter orders based on position of the inside market in relation to the displayed indicator, one method of which will be described hereinafter.

Figure 4:
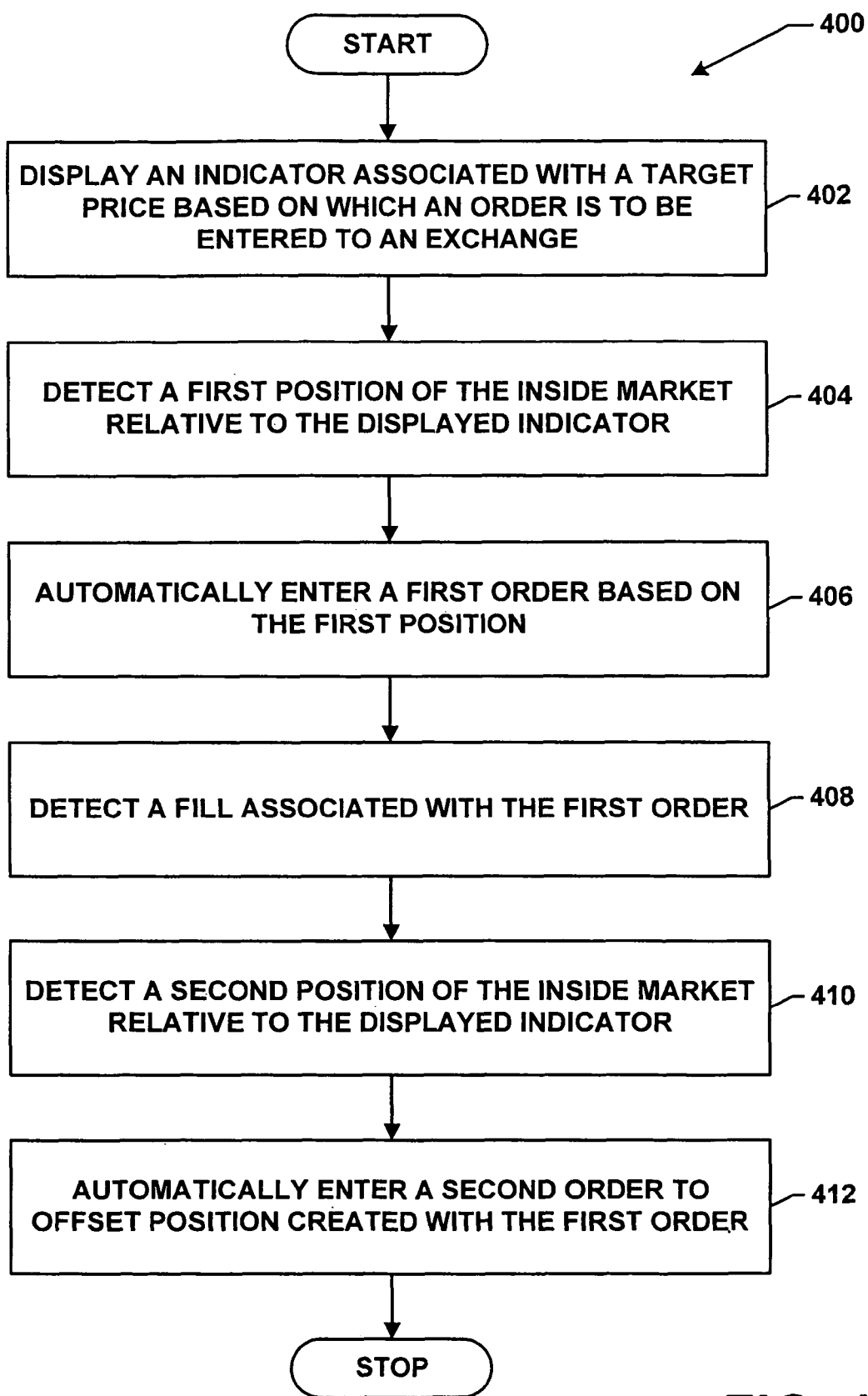
FIG. 4 is a flow chart illustrating a method for automatic scalping according to one embodiment using one graphical indicator associated with a price level.

FIG. 4 is a flow chart illustrating a method 400 for automatic scalping in an electronic trading environment according to one embodiment.

At step 402, the trading interface displays a graphical indicator associated with a target price, based on which orders may be automatically entered to an exchange. As explained in reference to the preceding figure, a trader may first activate the automatic scalping mechanism that may then automatically trigger a display of the graphical indicator via the trading interface. Once the indicator is displayed on the interface, the trader may reposition the graphical indicator to the desired target price level. Alternatively, a trader may activate an automatic scalping graphical interface At step 404, the automatic scalping application detects a first position of the inside market relative to the displayed indicator. For example, the first position may be detected when a price level of the inside market is above the target price level associated with the indicator. At step 406, the automatic scalping application automatically submits a first order to the exchange. When the inside market is above the target price level, the scalping application may submit a sell order. It should be understood that a trader may define a number of ticks between the inside market and the target price that, when detected by the scalping application, may activate submission of the first order to the exchange. Further, the trader can control a price level at which the first order is placed on the market so that the order is placed a number of ticks away from the target price. Further, once the inside market crosses the target price, the trading application may automatically place the order at a desired price level away from the target price. Alternatively, once the inside market reaches a predetermined price level, the order may be placed at the inside market.

At step 408, the automatic scalping application detects a fill associated with the first order. Once the first order is fully or partially filled, the scalping application may start monitoring the market movement until, at step 410, the second position of the inside market relative to the displayed graphical indicator is detected. According to an example embodiment, the second position is detected when the inside market goes back to (moves in a downward direction), or crosses the target price identified with the graphical indicator. Once the second position is detected, at step 412, the scalping application automatically enters a second order to offset the short position created with the first order. Similarly to the first order, a trader may configure a price level, such as a number of ticks away from the target price, at which the second order should be placed. The second order may be a market order or an order that the trading application may automatically place on the market once the application detects that the inside market has moved from a position above the target price to a position at or below the target price associated with the graphical indicator.

The method 400 for placing automatic orders has been described in relation to automatically placing a sell order when the inside market moves above the target price level, and then automatically submitting an offset buy order, once the market moves back to the target price. However, it should be understood that the method 400 may also be used when the market moves in opposite, upward direction. In such an embodiment, the trading application may first automatically place a buy order (when the market moves below the target price level) and, when the buy order is filled and the market moves back to the target price, the trading application could place a sell order to offset or close position created with the buy order and allow a trader to make profit.

Further, the method 400 has been described in reference to the embodiment in which two orders have been automatically placed on the market by the trading application. However, it should be understood that the method described above is not limited to the fully automated process. Alternatively, a trader can enter the first order manually, and once the scalping application detects the fill associated with the first order and then the movement of the market to the target price, the scalping application may automatically enter a second order to the market to offset position created with the first order. In addition, in another embodiment the method can also provide for the automatic entry of stop/loss orders in conjunction with the second order. The stop order would preferably be automatically canceled if the second order gets filled or canceled. Likewise, the second order is preferably cancelled if the stop order gets filled or cancelled. Such orders can be used to limit losses in the event the market moves in the wrong direction. If a trader is long, the stop loss order would be a sell stop below the inside market. If the trader is short, the stop loss order would be a buy stop above the inside market. Such orders can be entered at any price level based on a preset parameter, such as number of ticks above or below the market. The stop/loss order can be also be trailing stop order which automatically moves with the market in one direction. For example, a trailing sell stop order that is defined to be 3 ticks below the inside market will move up as the inside market moves up. Such trailing stop orders do not typically move if the market is moving towards the price of the stop order. Many exchanges support stops as a particular type of order. With respect to exchanges that do not offer this type of order, the trading software can synthetically provide for a trigger order that accomplishes the same result.

In another embodiment, instead of displaying a single indicator, an indicator range associated with a plurality of prices at which the tradable object can be automatically traded may be displayed instead. When a trader activates the automatic scalping, a trading interface may display a pair of graphical indicator bars, and the trader can move them in relation to the static axis of prices. Preferably, a trader can manipulate and position the indicator bars at the desired price levels by simultaneously pressing the control key and scroll wheel on the user's mouse. It should be understood that other mechanisms to activate and control position of the indicator bars can be used instead. For example, a dialog box generated by the trading application can be used to activate and control price levels associated with the indicator bars.

In an embodiment in which a mouse input is used to position parallel horizontal lines, the indicator bars define a price range where buy and sell quantities may be automatically entered upon detecting a fill associated with another order, such as a manually entered order, for example. More specifically, this feature automatically enters sell quantities when a trader's manually entered buy quantity is filled. Likewise, this feature will automatically enter buy quantities when a trader's manually entered sell quantity is filled.

Figure 5:
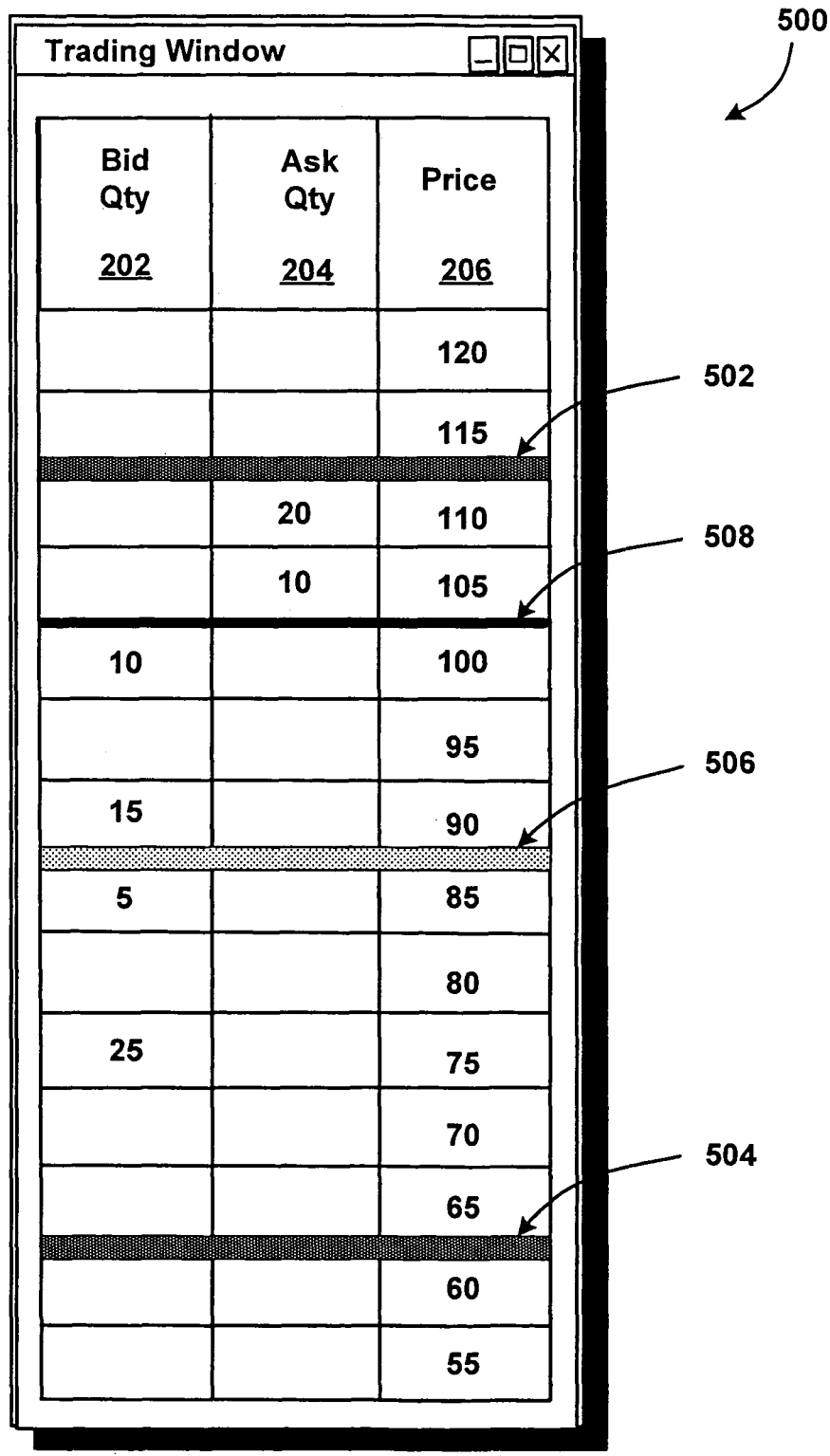
FIG. 5 is a block diagram illustrating a trading interface displaying an indicator range associated with a plurality of prices based on which one or more orders may be automatically sent to an electronic exchange.

FIG. 5 is a block diagram illustrating an example trading interface displaying an indicator range associated with a plurality of prices at which orders can be automatically entered on the market.

In a preferred embodiment, the indicator bars 502 and 504 span the bid column 202, the ask column 204, and the price column 206; however, alternatively, the indicators may be displayed in relation to a single column and may take any user-configurable format. The indicator bars 502 and 504 are set with the highest price at 110 and the lowest price at 65. The inside market, as indicated by the black line 508, is a buy price at 100, and a sell price at 105. Once the auto scalper application is activated, the indicators may be initially positioned in the mid-point of the prices displayed on the trader's display screen. In FIG. 5, the mid-point of prices is displayed with the indicator 506 and is between the prices 85 and 90.

Once the indicators are displayed at the mid-point of prices, a trader may scroll the wheel of the trader's mouse up causing the indicators to move further apart, thus leaving a greater number of prices within the range of the indicator bars 502 and 504. Consequently, when the trader scrolls the wheel down, the indicator bars move closer together, near to the mid-point, reducing the number of prices within the indicator range.

Figure 6:
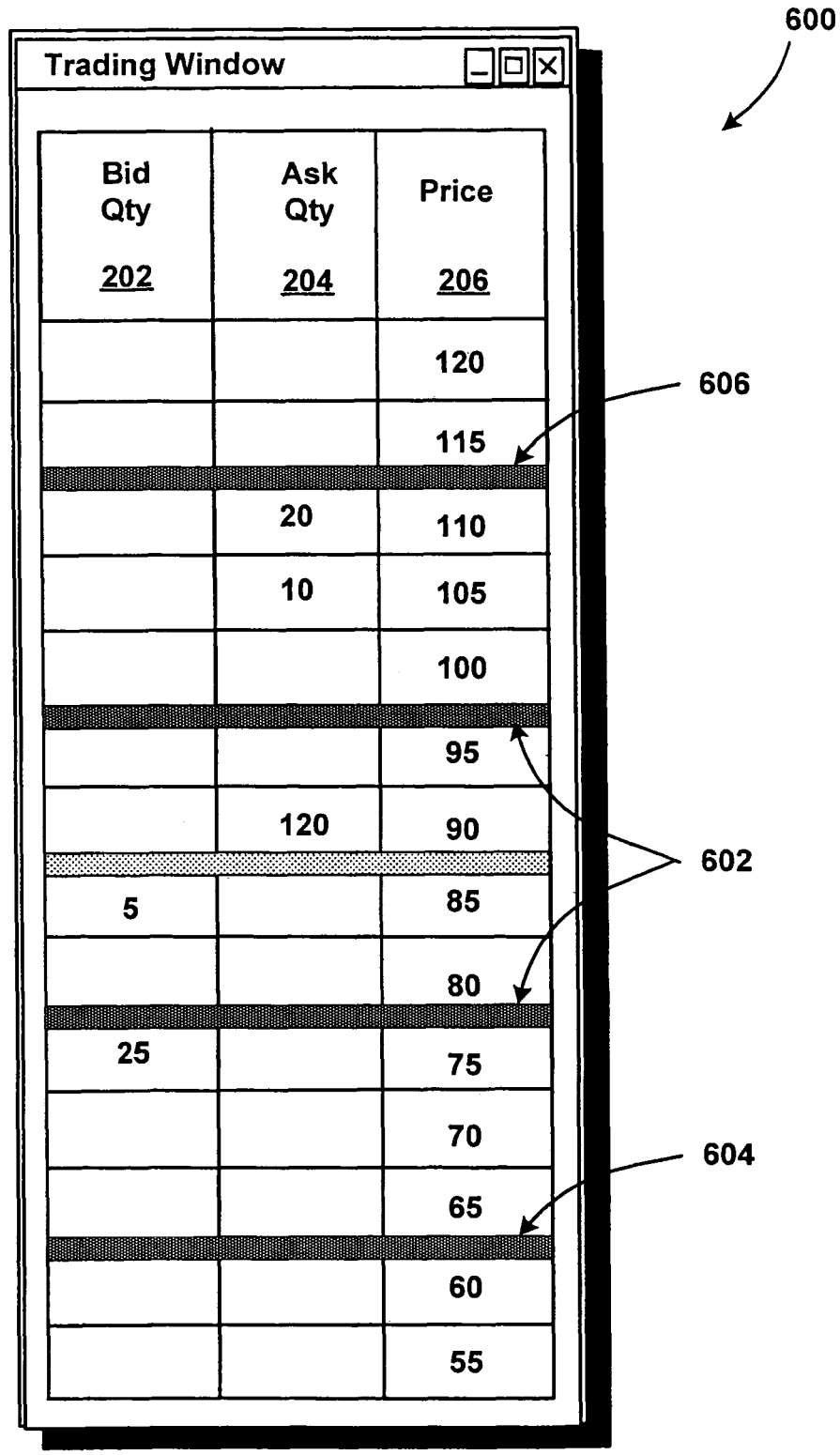
FIG. 6 is a block diagram illustrating a trading interface displaying an indicator range that can be repositioned by a trader to desired price levels.

FIG. 6 illustrates different positions of the indicator bars on the trading interface. When a trader activates the auto scalper application, two indicators, such as indicators 602, may be displayed in relation to a mid-point of prices. A trader may then scroll the wheel of the trader's mouse up or down causing the indicators to move in relation to the static axis of prices to indicator positions 604 and 606, thus setting a wider price range at which orders may be automatically placed on the market by the trading application. However, it should be understood that different methods for moving indicators in relation to the static axis of prices can be used as well. For example, a trader may drag and drop one of the indicators to a desired price level. Alternatively, a graphical interface may be used to specify price levels at which the indicators should be displayed on the trading interface.

In one embodiment, as explained earlier, the trading application may automatically enter an order to an exchange to offset position created with a fill associated with a manually entered order. A trader's position may be defined as a difference between the total quantity bought and the quantity sold, and the trader is considered to have a long position when the quantity bought is greater than the quantity sold. Similarly, the trader is considered to have a short position when the quantity sold is greater than the quantity bought. The more quantity the trader owns, the longer the trader's position will be. Conversely, the more quantity the trader sells, the shorter the trader's position will be. It may be desirable, however, to have neither a long nor short position, referred to as a closed position, at the time of each day's trading session. If the buy quantity that the trader has entered in the market is filled, thus giving the trader a long position, the system, if actuated by the user, may automatically enter a duplicate sell quantity, which, when filled, will close the trader's position. Likewise, if the sell quantity that the trader has entered in the market is filled, the system may automatically enter a duplicate buy quantity, which when filled will close the trader's position. The automatic scalper application automatically and preferably, immediately enters a duplicate buy or sell quantity, which when filled will close the trader's position, preventing the trader from carrying a long or short position for an extended period of time.

When a trader defines an indicator ranges associated with a plurality of prices, the automatic scalper application may select a price, within the indicator range, at which to automatically enter an order based on the preferences or rules preset by a trader. In one embodiment, a trader may specify that any sell/buy order entered by the automatic scalper application should be entered a specific number of ticks away from the inside market. For example, the order that is automatically entered may be, in a case of a sell order, at the lowest price above the inside market within the range of the indicator bars, and in the case of a buy order, at the lowest price below the inside market within the range of the indicator bars. Alternatively, the order may be a market order.

Further, it should be understood that an order that is automatically entered, may be at a price or distributed between prices calculated pursuant to any algorithm. For example, the quantity ordered may be evenly spread among prices above (in the case of a sell order), or below (in the case of a buy order) the inside market and within the range of indicator bars. The preferred embodiments are not limited to any particular technique for determining the price or prices at which the automatic order is entered. In the preferred embodiment, the user may set rules defining at what prices (whether at the best price or some other price) and when (whether immediately or upon detecting a predetermined market movement) the automatic scalper application sends automatic orders to an exchange.

Further, alternatively, the automatic scalper application may be used to set one range, using, for example, indicator bars, for buying quantity and another range for selling quantity, at the same time. In such an embodiment, the automatic scalper application, instead of waiting to detect a fill on a manually entered order, may automatically place buy and sell orders within the ranges set by a trader. For example, if the inside market is within the price range associated with the indicator bars for buying quantity, the automatic scalper application may send a buy order to an exchange. Then, once the inside market moves to the price range associated with the indicator bars for selling quantity, the automatic scalper application may send a sell order to the exchange to offset position created with the buy order. It should be understood that a trader may control the price levels at which the two orders are placed.

Further, it should be understood that the automatic scalping methods are not limited to a single scalping range, and multiple scalping ranges, using different pairs of indicator bars, may be activated in a single trading window. The different ranges may be distinguished by using, for example, different colors for the different pairs of indicator bars. In such an embodiment, when the market moves into one range, the automatic scalping application may enter orders at the price levels of that range. Further, scalping ranges may overlap so that, for example, the prices associated with indicator bars for selling quantities of one range may overlap with the prices associated with indicator bars for buying quantities of another range.

It should be understood that the above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications. For example, it should be understood that the randomization methods described above may be used separately, or in any combination specified by the user.

Further, it will be apparent to those of ordinary skill in the art that methods involved in the system for automatic scalping in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

We claim:

1. A method for trading a tradable object in an electronic trading environment, comprising:
   receiving market data for a tradeable object via a processor associated with a client device, the market data defining an inside market having at least a best bid price currently available for the tradeable object and a best ask price currently available for the tradeable object;
   displaying an axis of values for the tradeable object according to the market data via an output associated with the client device;
   displaying a target price indicator along the axis of values at one of a plurality of values of the axis of values associated with a target price for automatically submitting an order for the tradeable object via the output;
   monitoring movement of the inside market relative to the target price to detect the inside market crossing the target price via the processor;
   in response to detecting the inside market crossing the target price in a first direction, automatically submitting a first order at a first price for a first quantity of the tradeable object via the processor;
   determining that at least a portion of the first quantity has been filled at the first price via the processor; and
   in response to detecting that the inside market crosses the target price in a second direction, automatically submitting a second order at a second price for a second quantity of the tradeable object via the processor, wherein the second quantity offsets a position created by filling the at least a portion of the first quantity that was filled.

2. The method of claim 1 where the first direction includes a series of upward price increases and the second direction includes a series of downward price decreases.

3. The method of claim 1 where the first order comprises an order to sell and the second order comprises an order to buy.

4. The method of claim 3 where the order to buy is placed at a buy price being a first predetermined number of ticks away from the inside market and the order to sell is placed at a sell price being a second predetermined number of ticks away from the inside market.

5. The method of claim 3 where the order to sell comprises a first market order and the order to buy comprises a second market order.

6. A computer readable medium having stored therein executable instructions which when executed by a processor cause the processor to carry out a method for trading a tradable object, the method comprising:
   receiving market data for a tradeable object, the market data defining an inside market having at least a best bid price currently available for the tradeable object and a best ask price currently available for the tradeable object;
   displaying an axis of values for the tradeable object according to the market data;
   displaying a target price indicator along the axis of values at one of a plurality of values of the axis of values associated with a target price for automatically submitting an order for the tradeable object;
   monitoring movement of the inside market relative to the target price to detect the inside market crossing the target price;
   in response to detecting the inside market crossing the target price in a first direction, automatically submitting a first order at a first price for a first quantity of the tradeable object;
   determining that at least a portion of the first quantity has been filled at the first price; and
   in response to detecting that the inside market crosses the target price in a second direction, automatically submitting a second order at a second price for a second quantity of the tradeable object, wherein the second quantity offsets a position created by filling the at least a portion of the first quantity that was filled.

7. The computer readable medium of claim 6 where the first direction includes a series of upward price increases and the second direction includes a series of downward price decreases.

8. The computer readable medium of claim 6 where the first order comprises an order to buy and the second order comprises an order to sell.

9. The computer readable medium of claim 8 where the order to buy is placed at a buy price being a first predetermined number of ticks away from the inside market and the order to sell is placed at a sell price being a second predetermined number of ticks away from the inside market.

10. The computer readable medium of claim 8 where the order to sell comprises a first market order and the order to buy comprises a second market order.

* * * * *